US006249905B1

(12) United States Patent
Yoshida et al.

(10) Patent No.: US 6,249,905 B1
(45) Date of Patent: Jun. 19, 2001

(54) COMPUTERIZED ACCOUNTING SYSTEM IMPLEMENTED IN AN OBJECT-ORIENTED PROGRAMMING ENVIRONMENT

(75) Inventors: Kazuki Yoshida, Tokyo (JP); Ralph E. Johnson, 708 W. Green St., Champaign, IL (US) 61820

(73) Assignees: Kabushiki Kaisha Toshiba, Kawasaki (JP); Ralph E. Johnson, Champaign, IL (US)

( * ) Notice: Subject to any disclaimer, the term of this patent is extended or adjusted under 35 U.S.C. 154(b) by 0 days.

(21) Appl. No.: 09/008,218

(22) Filed: Jan. 16, 1998

(51) Int. Cl.[7] .................................................. G06F 9/45

(52) U.S. Cl. .................................. 717/1; 705/1; 345/335; 345/348

(58) Field of Search .................................. 345/335, 326, 345/339, 348, 352; 707/102, 103, 34; 705/22, 28, 30, 1; 395/701; 717/1

(56) References Cited

U.S. PATENT DOCUMENTS

| 5,261,037 | * | 11/1993 | Tse et al. ............................... 706/60 |
| 5,287,502 | * | 2/1994 | Kaneko .................................. 717/1 |
| 5,325,533 | * | 6/1994 | McInerney et al. ..................... 717/1 |
| 5,386,508 | * | 1/1995 | Itonori et al. ........................... 717/1 |
| 5,396,626 | * | 3/1995 | Nguyen .................................. 717/1 |
| 5,642,511 | * | 6/1997 | Chow et al. ............................ 717/1 |
| 5,699,310 | * | 12/1997 | Garloff et al. ......................... 717/1 |
| 5,787,283 | * | 7/1998 | Chin et al. ............................. 717/1 |
| 5,815,653 | * | 9/1998 | You et al. .............................. 717/1 |
| 5,936,860 | * | 8/1999 | Arnold et al. ......................... 700/95 |
| 5,937,189 | * | 8/1999 | Branson et al. ........................ 717/1 |
| 5,953,526 | * | 9/1999 | Day et al. .............................. 717/1 |
| 5,987,423 | * | 11/1999 | Arnold et al.. ........................ 705/14 |
| 6,014,637 | * | 1/2000 | Fell et al. .............................. 705/26 |
| 6,016,484 | * | 1/2000 | Williams et al. ....................... 705/39 |

OTHER PUBLICATIONS

Johnson, R.E.; "Documenting frameworks using patterns". ACM Digital Library[online], Conference on OOPSLA, pp. 63–76, Oct. 1992.*

Carlsen et al.;"An Event Language for Building User Interface Frameworks". ACM Digital Library[online], Proceedings of the ACM Siggraph symposium on User Interface Software and Technology, pp. 133–139, Nov. 1989.*

Garlan, D.; "The role of formal reusable frameworks". ACM Digital Library[online], Conference proceedings on formal methods in software development, pp. 42–44, May 1990.*

Durham et al.; "A Framework for Run–time Systems and its Visual Programming Language". ACM Digital Library[online], Proceedings of the 11th annual OOPSLA, pp. 406–420, Oct. 1996.*

Johnson, R.; "Frameworks=(components +patterns)". ACM Digital Library[online], Communications of the ACM, vol. 40, Iss. 10, pp. 39–42, Oct. 1997.*

Sutherland, J.; "Business Object Design and Implementation III". ACM Digital Library[online], 1997 conference on OOPSLA, pp. 58–62, Oct. 1997.*

(List continued on next page.)

Primary Examiner—James P. Trammell
Assistant Examiner—Kelvin Booker
(74) Attorney, Agent, or Firm—Hogan & Hartson, LLP.

(57) ABSTRACT

A computerized accounting system implemented using object-oriented programming techniques which permits construction of user-defined accounting or other business frameworks without modifying or recompiling the program code. A graphic user interface (GUI) is provided which enables a user to interact with the system to accomplish all required tasks, including designing and constructing the business framework, as well as inputting and processing data using the designed framework. The system supports modular design of complex frameworks. It also allows the user to specify changes in business rules within a framework and tracks the changes over time.

25 Claims, 23 Drawing Sheets

OTHER PUBLICATIONS

Sutherland, J.; "Business Object Design and Implementation Workshop". ACM Digital Library[online], Tenth annual conference on OOPSLA, pp. 170–175, Oct. 1995.*

Johnson, Ralph E. "Accounts: a framework for business transaction processing." http://st–www.cs.uiuc.ed/users/johnson/Accounts.html.

Johnson, Ralph E. "Transactions and Accounts." *Pattern Languages of Program Design* 2, pp. 1–12. Addison–Wesley, 1996.

Keefer, Paul Dustin. "An Object Oriented Framework for Accounting Systems." Thesis, M.S. University of Illinois at Urbana–Champaign, 1994.

* cited by examiner

COMPUTERIZED ACCOUNTING SYSTEM IMPLEMENTED IN AN OBJECT-ORIENTED PROGRAMMING ENVIRONMENT

FIELD OF THE INVENTION

The present invention relates to a computerized accounting system, and more particularly, to an improved computerized accounting system that permits changes in the system without modifying or recompiling the program code.

BACKGROUND OF THE INVENTION

Object-oriented programming systems (OOPS) such as Smalltalk, C++ and Java have become popular as software development tools. One advantage of object-oriented technology is its ability to improve reuse of code. In object-oriented programming, real world objects are represented by software entities called "objects" (also called "instances"), and states and behaviors of real world objects are defined as "attributes" and "operations" of the objects, respectively.

Object-oriented programming consists of designing and implementing objects, and specifying their interactions. An object-oriented programming system is characterized by the use of objects, classes, and concepts such as inheritance and polymorphism. An "objects" is a discrete, self-contained combination of data, together with operations on the data (typically referred to as "methods," which may be said to be "encapsulated" in the object). A "class" is an abstract characterization of a set of objects. All objects in this set may be said to belong to a particular class or to be created by the class. The term "inheritance" refers to a mechanism in an object-oriented programming language to define a new class by deriving the new class from an already existing class. The derived class is said to be inherited from the original class. The derived class may be called a subclass of the original class, which in turn may be called a superclass of the derived class. The derived class inherits all the data and methods from the existing class, but the derived class may add additional data or methods, or redefine inherited methods so that they behave differently than they do in the original class. The term "polymorphism" in object-oriented programming refers to identically-named methods having different behavior depending on the type of objects that they reference. When a method is invoked, polymorphism ensures that the appropriate operation occurs by determining at run time the object in question. Inheritance promotes code sharing, and polymorphism enables run-time binding of operations to objects.

Object-oriented technology has been used to develop business software "frameworks." A "framework" is an abstract design that describes the interaction between objects in a particular domain such as accounting, database, graphic user interface, operating system, inventory management, logistics, human resources management, etc. An accounting framework, for example, incorporates knowledge that is common to applications in the accounting domain. A user of the framework may use it to design an accounting system for a particular business, which involves designing the low-level details of the particular accounting system. An example of a such a framework for accounting systems is the ACCOUNTS software, a description of an earlier version of which may be found in Paul D. Keefer, AN OBJECT-ORIENTED FRAMEWORK FOR ACCOUNTING SYSTEMS, a Masters thesis submitted to the Graduate College of the University of Illinois at Urbana-Champaign, 1994.

ACCOUNTS is a framework, implemented in an object-oriented programming system, for making computerized business transaction processing systems. Under this framework, a user uses the ACCOUNTS system to define "accounts" and "transactions." Transactions may be considered time-stamped records, which are posted to accounts. Each account keeps track of and stores the transactions that affect it. Accounts may be, for example, inventory journals, bank accounts, employee records, etc.; while transactions may be, for example, purchases and sales transactions, deposits and withdrawals, time cards and paychecks, etc. An account may also have a set of attributes, which may be running totals computed from the transactions stored therein. For example, an inventory account may have attributes such as on-hand, sales month-to-date, and cost of goods sold month-to-date; while an employee record may have attributes such as overtime worked on this pay period, amount of salary due, hourly wage, and accrued vacation. In a particular ACCOUNTS system, the accounts, transactions and account attributes, as well as the relationship between them, are defined as a set of "business rules." For example, a business rule may specify that a sales transaction is to be processed by posting the amounts of goods sold in appropriate inventory accounts and posting the proceeds received in a cash account.

A new ACCOUNTS system, e.g., for a particular business, is designed by defining the accounts and transactions of the system, the attributes of each accounts, as well as how the transactions are processed by the accounts. (The term "ACCOUNTS" is used in this specification to refer to either the software that implement the ACCOUNTS framework, or a particular ACCOUNTS system designed by a user for a particular business.) Once an ACCOUNTS system is set up, a user may use it to, for example, create transactions and query attributes of accounts. Transactions may come from other computerized systems, such as a check-writer for an accounts payable system or a payroll system, or may be created by a user by filling out an input screen. Queries may be generated from a graphic user interface (GUI) tool, from reports such as bank statements or monthly reports of sales, or from computer programs that create transactions, such as a check-writer that uses a query to decide the amount of the check to be written.

Thus, normally, an end user interact with an ACCOUNTS system by creating transactions and querying attributes. When setting up an ACCOUNTS system for a business, or changing an ACCOUNTS system in response to changes in business rules, however, a user may be required to, for example, add or change the definition of transactions, accounts, or attributes. These types of interactions are traditionally accomplished by programming, which requires the user to enter or modify program code and to recompile the code to generate executable programs.

It is therefore desirable to provide a computerized system in which new or modified programs may be composed without entering, modifying or recompiling any program code. It is further desirable to provide such a system that employs a graphic user interface. It is also desirable to provide such a system in which changes in business rules may be tracked over time and appropriate business rules may be applied to transactions processed at a given time.

SUMMARY OF THE INVENTION

According to one aspect of the present invention, a development tool is provided for constructing custom-designed ACCOUNTS systems from reuse program components without the need to enter, modify or recompile any program code. Implemented in an object-oriented programming language, the system according to embodiments of the present invention enables insertion and deletion of reuse program components into and from the program without generating or modifying the program code, either by the user or by the computer, and without recompilation. This is accomplished using object-oriented programming techniques such as inheritance and polymorphism.

According to another aspect of the present invention, user-defined reuse components may be composed from existing reuse components without entering, modifying or recompiling any program code. This promotes reuse of code and facilitates a modular design of custom ACCOUNTS systems.

According to yet another aspect of the present invention, business rules are represented as objects and changes in the business rules are tracked over time. This enables a user to specify the time periods for which a particular business rule is in effect, and enables the system to apply the appropriate business rules that are in effect at the time a particular transaction is processed.

According to yet another aspect of the present invention, a graphic user interface (GUI) is provided that enables a user to interact with the system and to accomplish all required tasks, including designing a custom ACCOUNTS system and using the designed system to process input data, without the need to enter any program code. For example, a GUI allows a user to construct an ACCOUNTS system by putting icons on the screen to represent components of the accounting system and by drawing lines linking the icons to represent the relationship between the components. The GUI also allows a user to compose reuse components from existing reuse components, and to define changes in business rules.

DETAILED DESCRIPTION OF THE EMBODIMENTS

The ACCOUNTS system according to embodiments of the present invention described herein is implemented on a computer. Each functionality of this system is implemented on a computer, and each functionality of this system is implemented by running the computer according to a procedure stored in the form of a program. Therefore, in the following discussion, this system will be described using virtual circuit blocks each having an associated functionality.

The computer hardware configuration is flexible. In general, the computer consists of one or more CPU (central processing unit) and a main storage such as a RAM (random access memory). The computer can be of any size, such as a microcomputer, personal commuter, small computer, workstation, mainframe computer, or a plurality of computers connected on a network. Typically, the hardware of the computer consists of external storage units such as a hard disk, and user interface devices including input devices such as a keyboard and a mouse, output devices such as a CRT display and a printer, and input/output control circuits. Other types of input, output and storage devices may be used.

Typically, the software for implementing this system on the computer consists of an application program for implementing each functionality of this system and an operating system under which the application program is executed. The computer software configuration is also flexible. That is, as long as the present invention can be implemented, the software configuration may be changed.

The term "means" (or "sections") used in this specification refers to a conceptual means corresponding to each functionality of this system. There is not always a one to one correspondence between means or sections and hardware or software units. For example, the same hardware or software component sometimes constitutes different means or sections.

Methods for implementing certain features of the graphic user interface described in this specification, such as using an input device to open a window, activate a pop-up menu, select an item from a menu, position an icon, draw a geometric figure, or the like, as well as the rendering of the image displays on the output device, are well known in the art and will not be described herein. In addition, terms used to refer to various graphic features used in the illustrated embodiments, such as "menu", "window", "button", "icon", "line", etc., should be understood broadly to encompass any suitable graphic representations.

The system is assumed to be implemented on a computer, but all or part of this system may also be implemented in an electronic circuit.

The Framework

The embodiments of the present invention will be described in an accounting domain, but the invention may be applied to a wide range of domains such as database, graphic user interface, operating system, inventory management, logistics, human resources management, etc.

Figure 1:
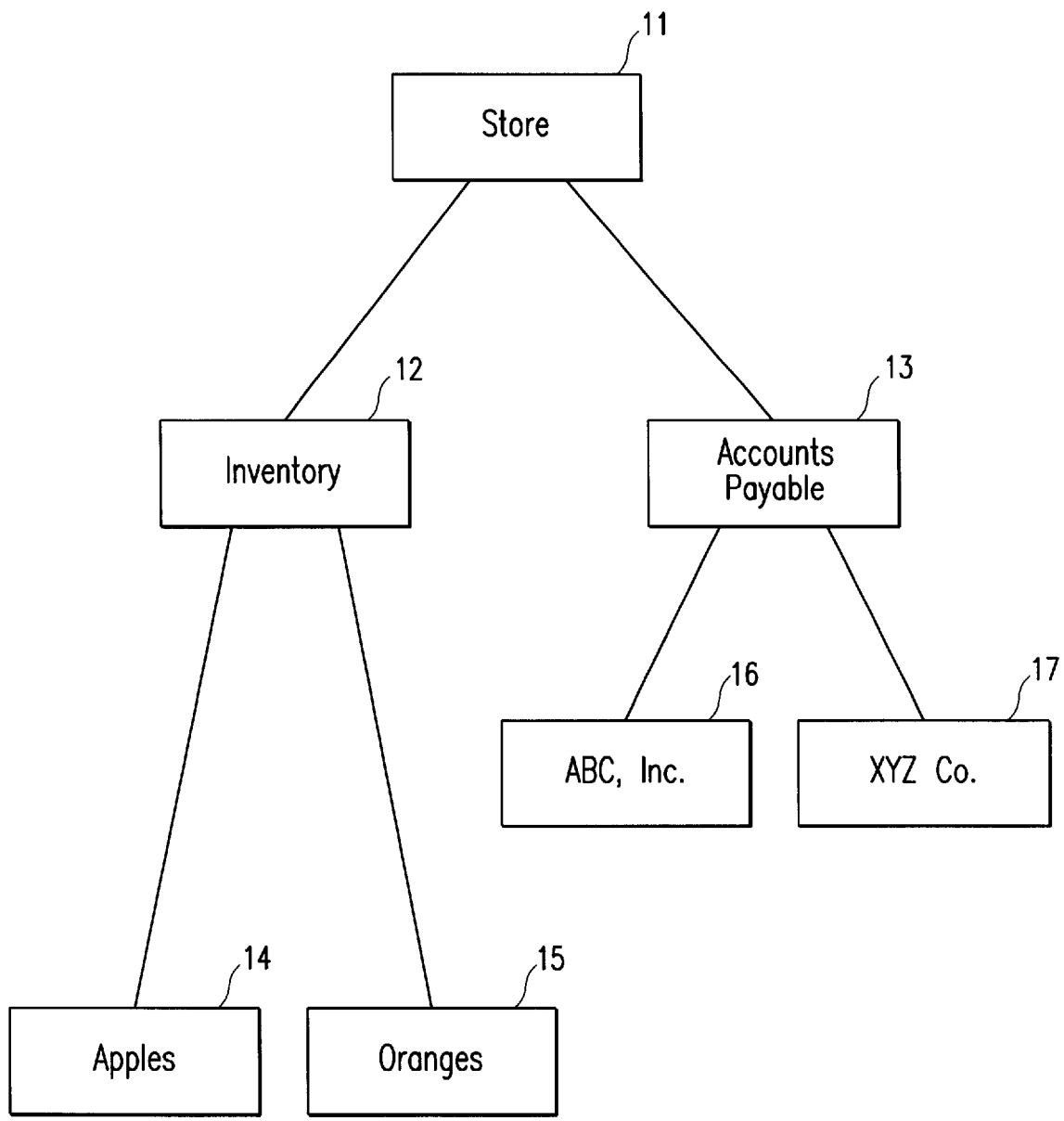
FIG. 1 illustrates a sample accounts tree.

The framework for the ACCOUNTS system will now be described. FIG. 1 shows a sample account tree for a store. The top-level account, "Store" 11, may include an "Inventory" account 12 and an "Accounts Payable" account 13. Accounts 12 and 13 may be referred to as "component accounts" of account 11. The Inventory account may in turn Up include a plurality of accounts, each for a type of goods, such as "Apples" 14 and "Oranges" 15. The Accounts Payable account may include a plurality of accounts, each for a vendor, such as accounts 16 and 17. Accounts may be classified into three types. The lowest-level accounts, such as accounts 14–17, are "simple" accounts, which store transactions posted to them. Group accounts that contain relatively homogeneous components, such as Inventory 12 and Accounts Payable 13, are called "composite accounts." The component accounts of the composite accounts typically have a common set of attribute names. Group accounts that contain heterogeneous components, such as Store 11, are called "aggregate accounts."

Figure 2:
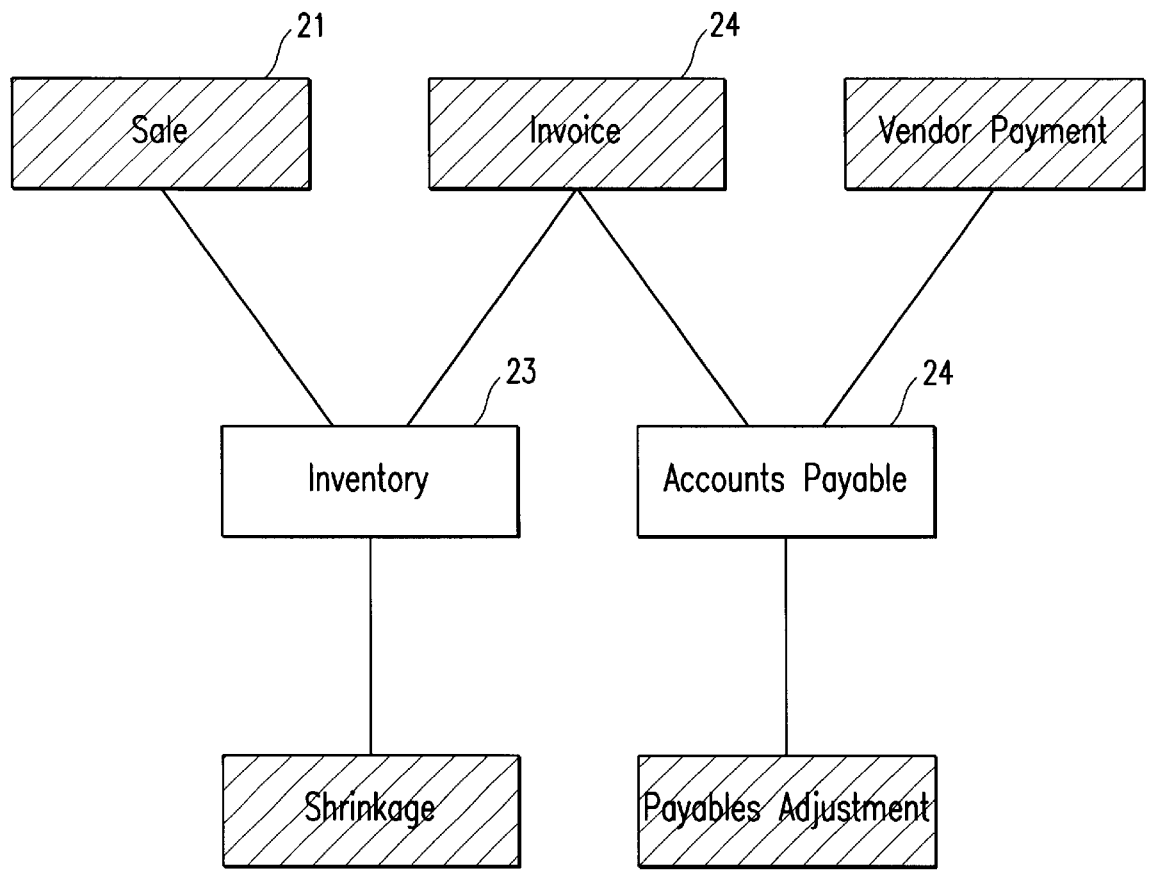
FIG. 2 illustrates sample transactions for the accounts tree system shown in FIG. 1.

FIG. 2 illustrates examples of transactions (shaded boxes) that the accounts system of FIG. 1 may have, as well as the relationship between the various types of transactions and accounts. For example, a "Sales" transaction 21 affects the Inventory account 23 only, while an "Invoice" transaction 22 affects both the Inventory account 23 and the Accounts Payable account 24.

Figure 3:
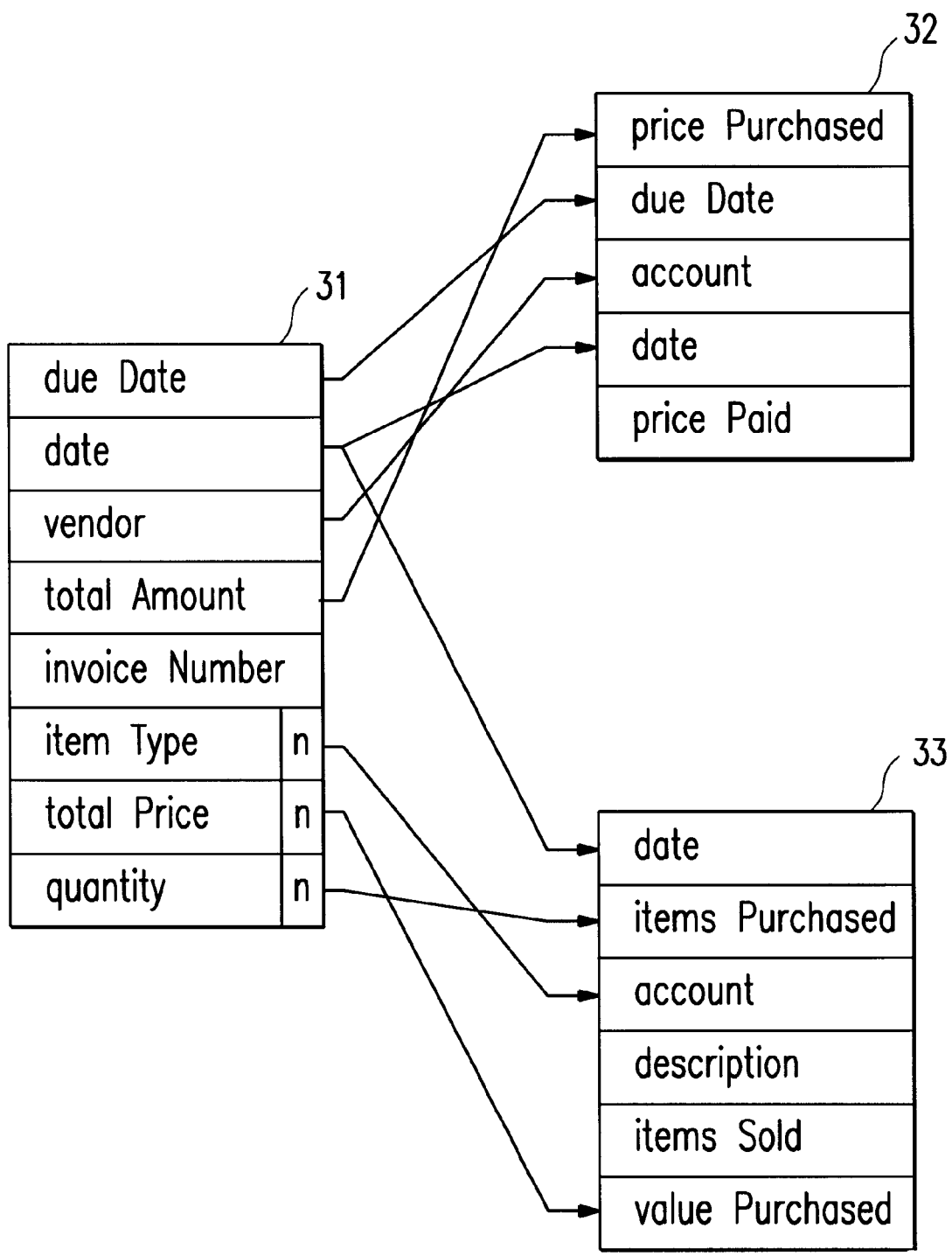
FIG. 3 illustrates a sample transaction mapping.

When a transaction is posted, it is posted to the root account of an account tree (e.g. the Store account in FIG. 1), which then passes it down through the lower-level accounts in the tree until it reaches one or more simple accounts where it is stored. Different types of accounts process a transaction posted to them in different ways. A simple account simply stores the transaction. A composite account typically sends the transaction to one of its component accounts. For example, the Inventory account in FIG. 1 may send a Sales transaction it receives to either the Apples or the Oranges account, depending on the value of the "type of goods" field in the transaction. This may be referred to as a "classify" function. An aggregate account typically converts the transaction into one or more new transactions and post the new transactions to one or more of its component accounts. The new transactions generated within the system may be referred to as "internal transactions," whereas transactions posted to the system from outside the system may be referred to as "external transactions." For example, when an Invoice transaction (external transaction) is posted to the Store account, the Store account may create two internal transactions, one of which may contain information relating to the amount of goods sold and may be posted to the Inventory account, the other of which may contain information relating to the amount of money and may be posted to Accounts Payable account. FIG. 3 shows how a Sales transaction 31 is "split" into a transactions 32 which is to be posted to the Accounts Payable account, and a transaction 33 which is to be posted to the Inventory account. The mapping of the data items of a transaction into one or more internal transactions, shown in FIG. 3, may be referred to as "transaction mapping."

Thus, each account in the accounting system may be considered a process applied to a transaction. For example, a simple account may be considered a process by which a transaction is stored. A composite account may be considered a process by which the transaction is classified and posted to one of the component processes (component accounts). An aggregate account may be considered a process by which a transaction is split or transformed into two or more new transactions and posted to two or more component processes (component accounts). According to an embodiment of the present invention, these processes are implemented in an object-oriented programming system as distinct reuse program components.

Thus, as used in this specification, an "account" in the accounting framework is sometimes also referred to as a "process," or a "reuse component" or simply a "component." For example, the above-described processes may be referred to as the Simple, Classify, and Split components, respectively.

Having described the framework for the ACCOUNTS system, various aspects of the present invention will now be described.

The Graphic User Interface

FIGS. 4a–4e illustrate the graphic user interface (GUI) for the ACCOUNTS system with reference to an example in which a process tree is designed and a program is composed from reuse program components. As shown in FIGS. 4a–4e, a user designs an process tree by placing icons and drawing lines on the computer screen. (The borders in FIGS. 4a–4e depict a user interface window 1 on the screen). The icons represent reuse program components, and the lines linking the icons represent the sequence of the processes. The computer composes a program according to the process tree graph using reuse program components, and the program may then be executed to process transactions or saved for later use.

Figure 4A:
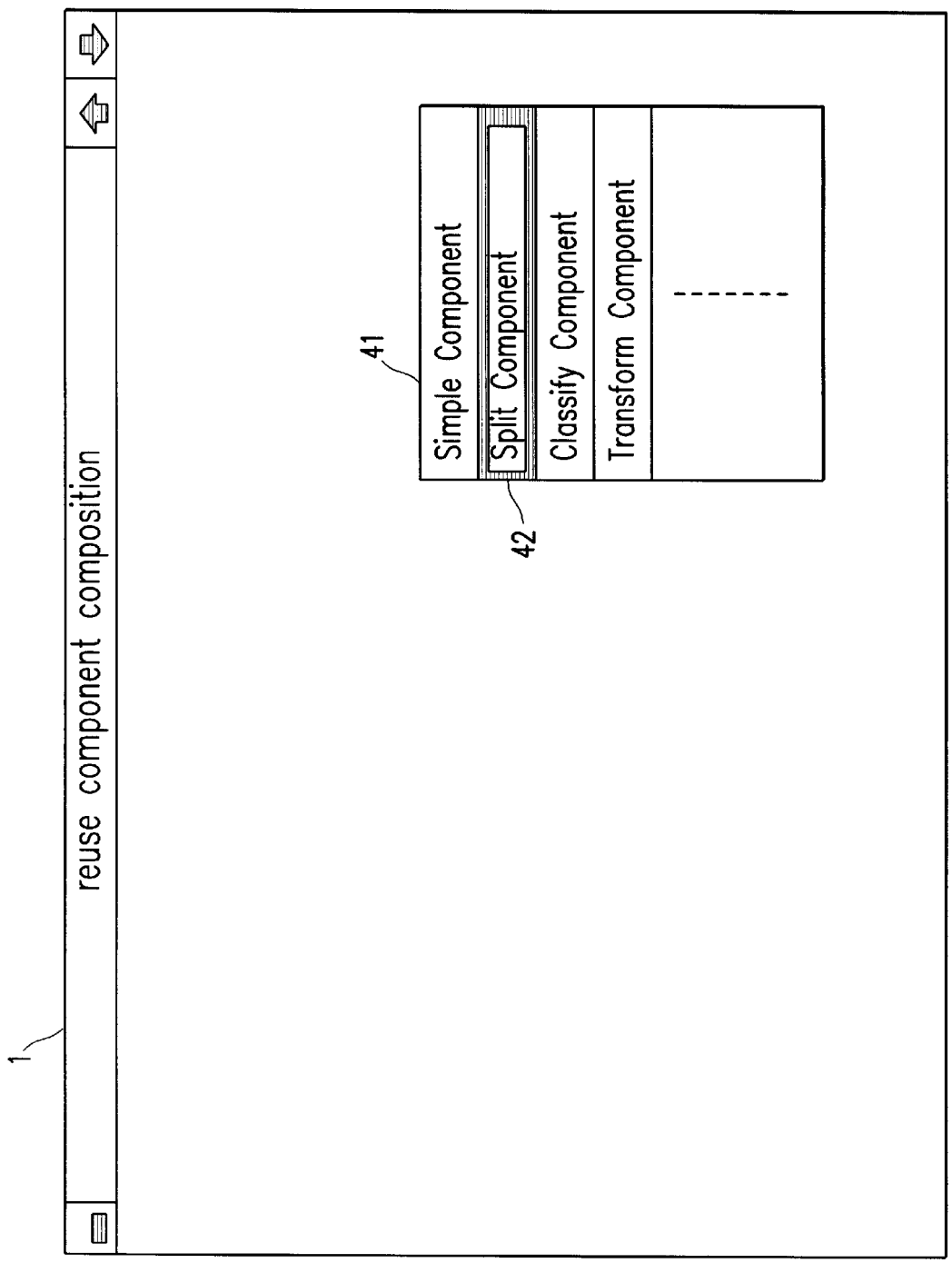
FIGS. 4a–4e show an example of designing a process tree using the graphic user interface according to an embodiment of the present invention.
Figure 4B:
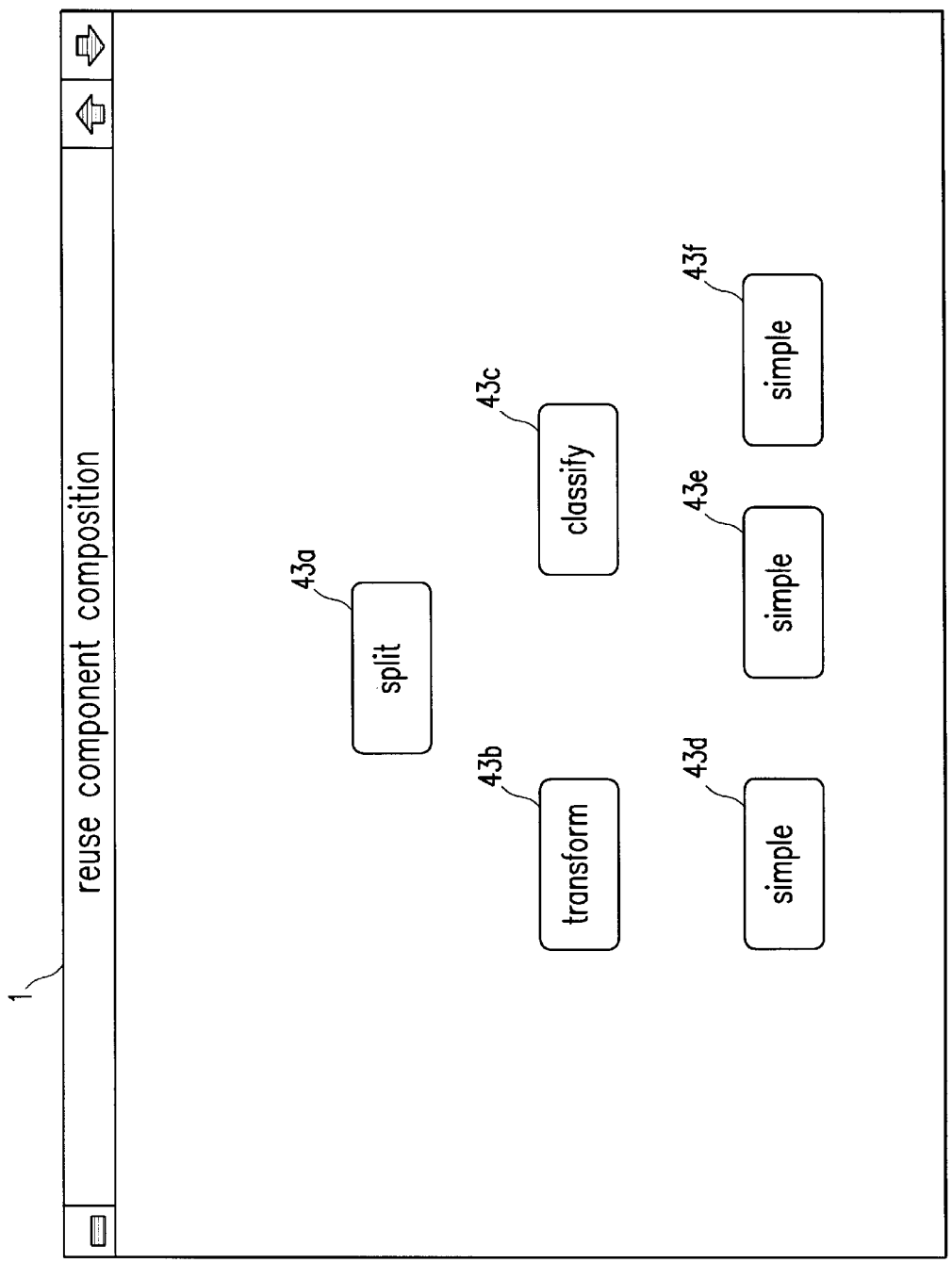
Figure 4C:
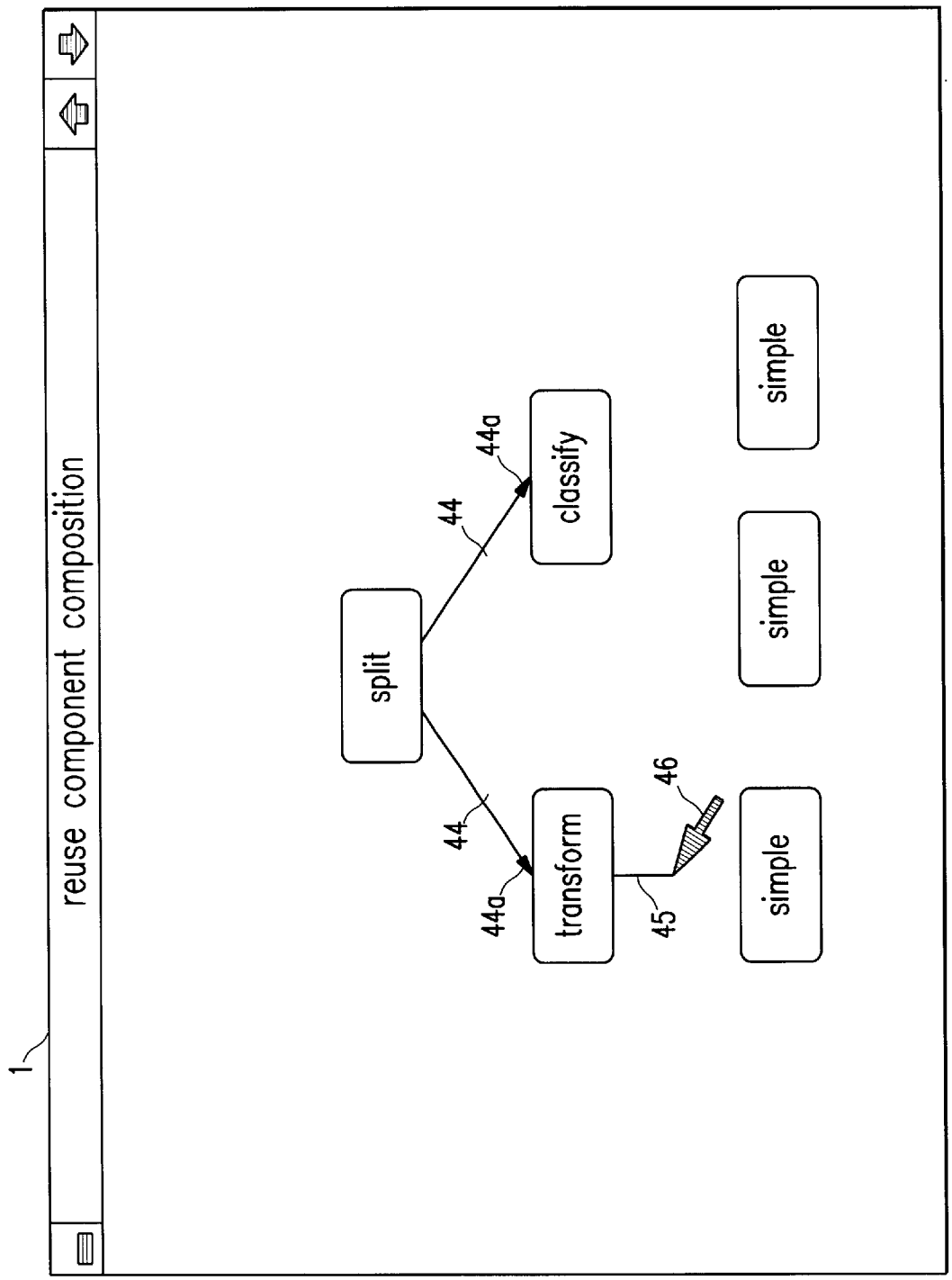

Referring to FIG. 4a, using the input device, the user first activates a screen display, such as a pop-up menu 41, which contains a list of available reuse components. The user then selects a menu item 42 from the menu and indicates the position on the screen where the icon is to be displayed. A graphic representation (icon) 43a of the selected reuse component is displayed on the screen at the position selected by the user (FIG. 4b). The above steps are repeated until all components 43a–43f are placed on the screen at the desired positions (FIG. 4b). The user then use the input device to draw directed lines 44 on the screen linking the components 43a–43f according to the user's design of the process tree (FIG. 4c). FIG. 4c shows the lines 44 drawn and the line 45 being drawn. (Numeral 46 represent a cursor used by the user to draw the line 45.) The directed lines 44 indicate the sequences of the processes, and the arrows 44a associated with lines 44 represent the directions that transactions are sent from one process to another.

Figure 4D:
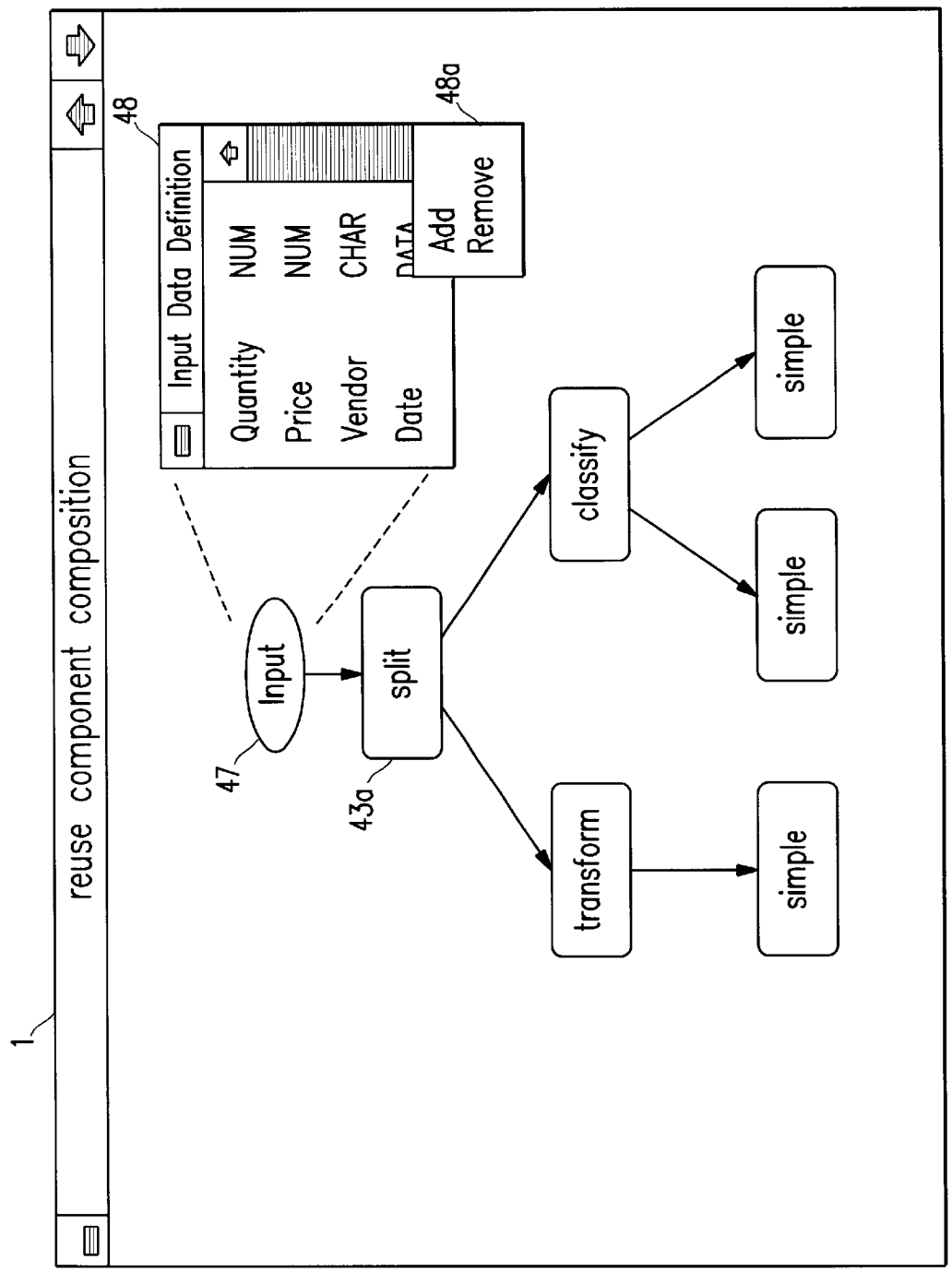

One of the icons in the process tree may be an "Input" icon 47, which represents an Input component (FIG. 4d). In the illustrated example, the Input component 47 is connected to the Split component 43a. The Input component is the starting point of the sequences of processes defined by the process tree, and may be used to input a transaction for processing. The user may activate an Input Data Definition window 48 (e.g. by clicking a mouse button when the cursor is pointed at the Input icon), which enables the user to define the input scheme, such as the data fields that a transaction may have. The Input Data Definition window 48 may include a pop-up menu 48a to enable addition and removal of data fields in the input scheme.

Figure 4E:
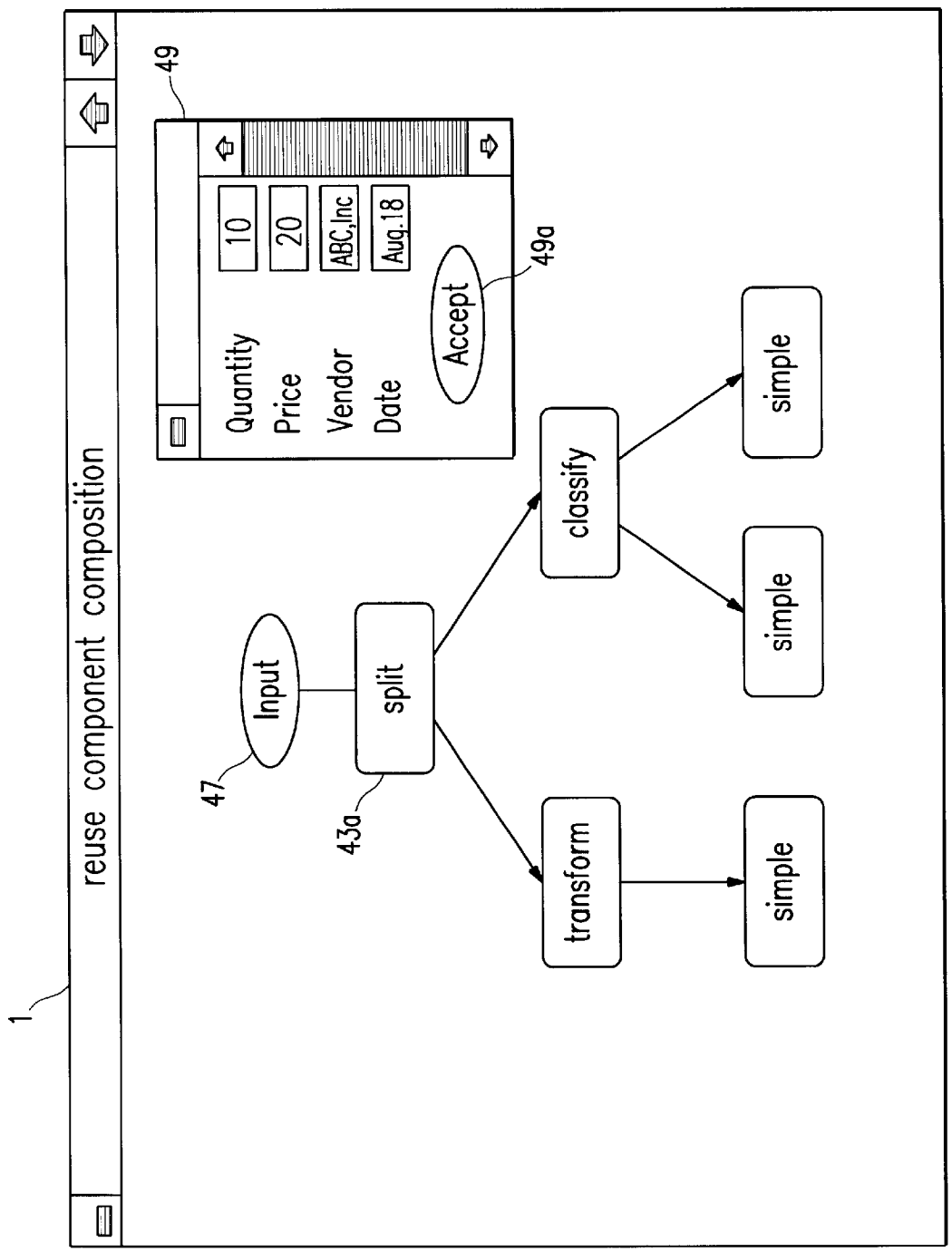
Figure 4F:
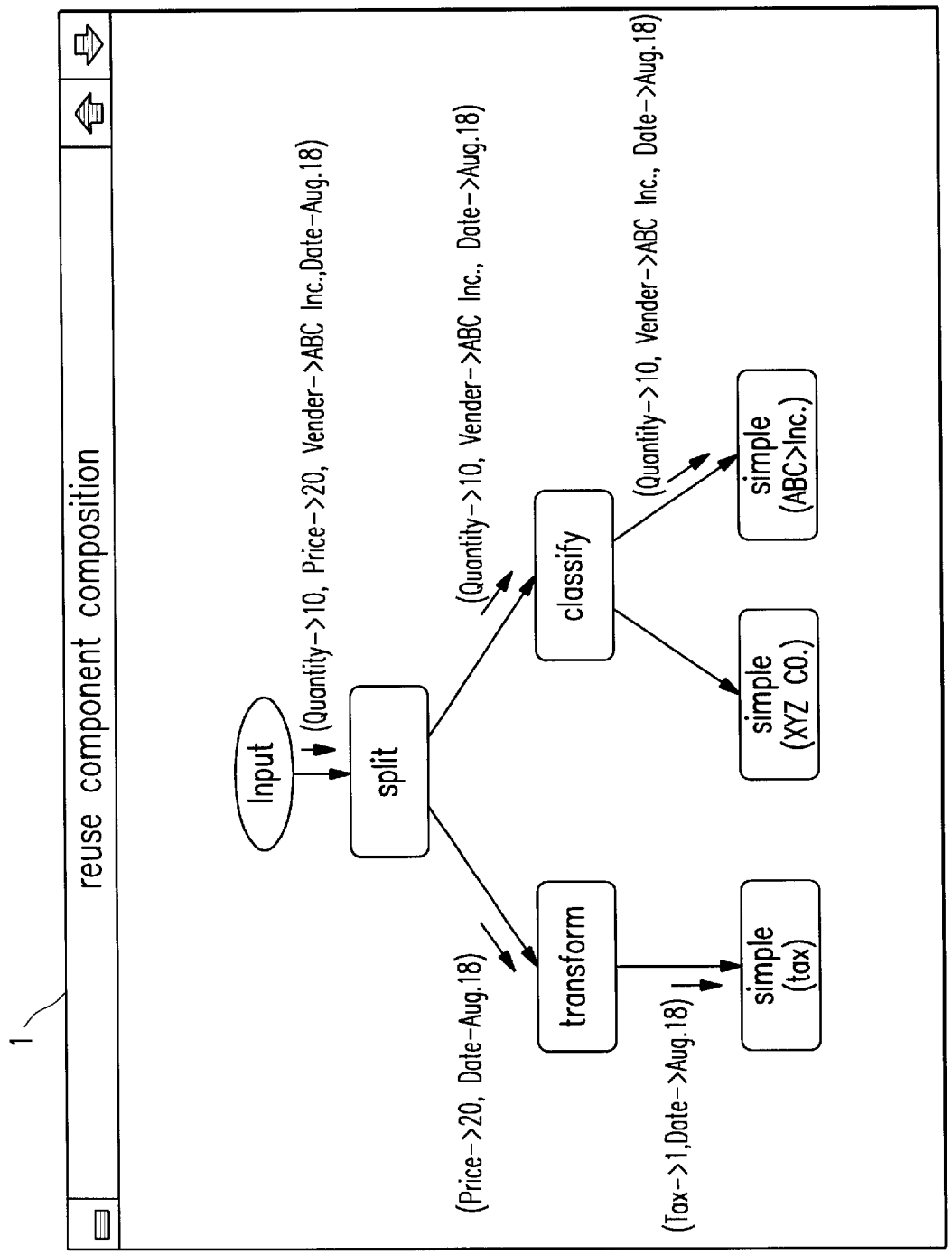
FIG. 4f illustrates processing a transaction by the process tree shown in FIGS. 4a–4e.

After the input scheme is defined, the user may activate an input window 49 (e.g. by double clicking a mouse button when the cursor is pointed at the Input icon) to input data for a transaction (FIG. 4e). After all the data items for the transaction are inputted, the user clicks an "Accept" button 49a in the input window 49 (FIG. 4d). This initiates the processing of the inputted data, which will proceed according to the sequences of processes represented by the process tree drawn by the user, as illustrated in FIG. 4f. (in FIG. 4f, the text enclosed in parentheses and the arrows next to the text are not parts of the GUI display and are only included in the drawing to explain how data is processed by each component.) The process tree defined by a user may also be stored in the computer, and redisplayed and used at a later time to process input data.

Although in the example shown in FIGS. 4a–4d the connecting lines are drawn after the component icons are placed, the icons (including the input icon) and the lines may be put on the screen in any order. For example, lines between some icons may be drawn before other icons are places on the screen. In addition, the actual positions of the component icons and directed lines on the screen are not important, so long as the relative positions of the icons and lines indicate the relation between the components.

The icons in the GUI represent reuse components, i.e. units of processes. The reuse components are existing program components, which may be implemented in an object-oriented programming system as objects encapsulating methods, or classes the methods belong to. Using the GUI, the user composes a program from existing reuse components without generating, modifying or recompiling any program code. This process, referred to as "program composition," is accomplished by using object-oriented techniques, which will now be described. (Unless otherwise specified, the examples used in the following description are in C++ syntax.)

Implementation of Program Composition

In non-object-oriented programming systems, reuse program components are typically provided in the form of functions. Insertion and deletion of such program components requires compilation of the program. In object-oriented programming systems, on the other hand, reuse components are typically provided in the form of objects. An object is created from a class in which attributes and methods are defined. In this specification, the methods defined in a class are also referred to as "member functions" of the class or objects created from the class. A member function of an object may be invoked by referencing the function or passing a message to the object. In an object-oriented programming system, an object takes a set of pointers to compiled codes of its member functions. When a function of an object is invoked, the code invoking the function is replaced by a pointer to the invoked function of the object. This is performed dynamically during execution, instead of during program compilation.

To accomplish program composition without generating any code or recompiling, all reuse components are provided in the form of classes having the same interface:

C1::f(arg1, . . . , argN)
C2::f(arg1, . . . , argN)
C3::f(arg1, . . . , argN)
C4::f(arg1, . . . , argN)

"C1::f" is a C++ syntax for referring to a method "f" of a class "C1". In the above example, each of classes C1, C2, C3, C4, . . . implements a function f having the same interface f(arg1, . . . , argN). According to the principle of polymorphism, the functions represent different operations depending upon the classes they are defined in. For example, the function C1::f, C2::f, C3::f, and C4::f may implement the "Simple" process (to store input data), the "Classify" process (to classify input data), the "Split" process (to split input data), and the "Transform" process (to transform input data), respectively. All of these functions, however, have the same interface f(arg1, . . . , argN).

Thus, according to an aspect of the present invention, all reuse program components have the same interface. This is accomplished in the object-oriented programming system by using the inheritance mechanism, by which subclasses derived from a superclass may have the same interface as the superclass. Preferably, a single superclass is used to define a common interface for all reuse components in the ACCOUNTS system.

To accomplish program composition, a data structure such as an array, a list or a dictionary is used to hold an arbitrary set of components and to facilitate insertion and deletion of succeeding components. The use of such a data structure also facilitates the sequential invocation of the components. For example, the "main" function of the software may be implemented as follows:

```
main ( ) {
  . . .
  for (i=0, i<n, i++) {
    a[i].f(arg1, . . . , argN);
  }
  . . .
}
``` where "a[i].f" is a C++ syntax for invoking a method "f" in an object "a[i]". In the above example, an array a[i] is used to hold a set of objects. The member functions f(arg1, . . . , argN) of the objects a[i] are invoked using a loop, and the operations defined by the respective member functions are thereby performed sequentially. To insert (or delete) reuse components, the desired reuse components (implemented as objects) are assigned to the array elements a[i]. For example, in the above example, a process to classify input data and store the data in an simple account may be implemented by assigning the an object belonging to class C2 (which implement a "Classify" process) to the array element a[0], and an object belonging to class C1 (which implements a "Simple" process) to the array element a[1]:

a[0]=new C2;
a[1]=new C1;

Thus, when the loop is executed, the Classify and Simple components will be executed to implement the corresponding processes. Insertion of new components may be done by assigning the inserted components to appropriate array elements. For example, the following assignment a[0]=new C2;
a[1]=new C4;
a[2]=new C1;

will result in a "Transform" process (implemented by an object belonging to class C4) being inserted between the "Classify" components (implemented by an object belonging to class C2) and "Simple" component (implemented by an object belonging to C1) in the previous example.

The system also enables chains of invocations. For example, it enables a component B invoked by a component A to further invoke a component C. (In this specification, a component is sometimes said to be "invoked," and it should understood that, in the context of an object-oriented programming language, what is invoked is typically the methods of an object.) This is accomplished by implementing each member function of a succeeding component (e.g. component B with respect to component A) such that when a member function of the succeeding component (component B) is invoked by its preceding component (component A), the succeeding component (component B) invokes functions of the same name of its (B's) own succeeding components (e.g. component C). For example, a member function f(arg1, . . . , argN) of component B may be implemented as follows:

```
ClassB::f(arg1, . . . , argN)
{
  SuperClass a[N];
  . . .
  for (i=0, i<N, i++) {
    a[i].f(arg1', . . . , argN');
  }
  . . .
}
``` where "ClassB" is the class to which object B belongs, and "SuperClass" is preferably the superclass from which ClassB inherits. In this example, the succeeding components are held in an array a[N]. The succeeding components preferably inherit from the same superclass from which the invoking component inherits. Preferably, the function interface f(arg1, . . . , argN) is originally declared in the superclass.

The assignment of objects to the array elements is done at run time by the user via the GUI. For example, when icons representing components B and C are placed on the display screen and a line is drawn from component B to component C, an assignment is effected in component B which assigns component C to an array element. Such assignments do not involve any change of the program code, and therefore do not require recompilation. Thus, by utilizing the object-oriented programming techniques described above, program composition can be achieved by which reuse components are used to compose a program without generating or modifying any program code (either by the user or by the computer), and without recompilation.

The Structure of the System

The structure of the ACCOUNTS system will now be described with reference to FIG. 5, which is a functional block diagram of the structure of an embodiment of the present invention. Each functional block in the diagram may be implemented either in hardware or in software, but each block is not necessarily a distinct hardware or software component.

Figure 5:
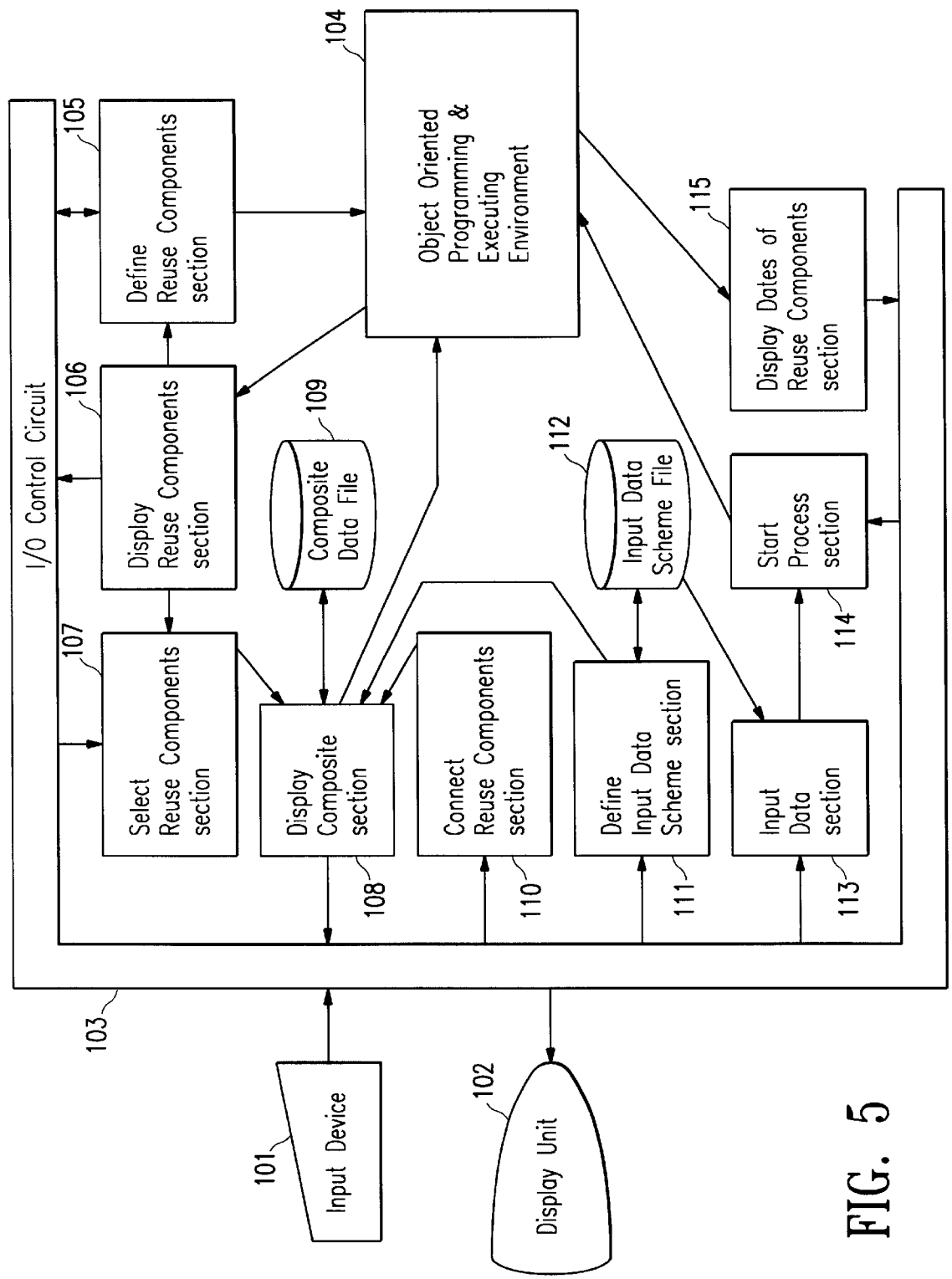
FIG. 5 is a functional block diagram illustrating the structure of an embodiment of the present invention.

As shown in FIG. 5, the system includes an input device 101 which may be a keyboard and/or a mouse, and a display unit 102 which may be a CRT screen. An I/O control circuit 103 manages the interface between the input device 101, the display unit 102 and other components of the system. The system also includes an Object-oriented Programming and Executing Environment 104, which manages all definition, compilation, composition and execution of reuse components in the background of the system. A Display Reuse Components section 106 receives definitions of reuse components from the Object-oriented Programming and Executing Environment 104 and displays the definitions in formats that facilitate browsing by the user, such as a pop-up menu shown in FIG. 4a. A Define Reuse Components section 105 allows a user to define reuse components, and provides appropriate restrictions for defining new reuse components so that the user-defined components will collaborate with other reuse components. Section 105 also registers the definition of user-defined reuse components into the Object-oriented Programming and Executing Environment 104.

A Select Reuse Components section 107 responds to selection inputs from the input device 101 which represent a user's selections of reuse components, and instructs a Display Composite section 108 to display graphic representations of the user-selected reuse components on the display unit 102. A selection input may be, for example, in the form of a selection from a menu displayed by the display reuse components section 106. The graphic representations of the reuse components may be, for example, icons 43a–f shown in FIG. 4b. A Connect Reuse Components section 110 responds to connection inputs from the input device 101 which represent a user's definition of connections between reuse components, and instructs the Display Composite section 108 to display graphic representations of the user-defined connections on the display unit 102. A connection input may be, for example, a mouse operation connecting an icon representing a reuse component to another icon representing another component. A graphic representations of the user-defined connections may be, for example, in the form of a directed line linking the icons, such as lines 44 shown in FIG. 4c.

In addition to displaying graphic representations of reuse components and connections between them at the request of the Select Reuse Components section 107 and the Connect Reuse Components section 110, the Display Composite section 108 stores data representative of the received selection and connection inputs in a Composite Data File 109. According to the selection and connection input data, the Display Composite section 108 creates objects and invocations of the objects in the Object-oriented Programming and Executing Environment 104. Section 108 therefore facilitates the regeneration of composed programs from reuse components.

A Define Input Data Scheme section 111 responds to request from the input device 101 and instructs the Display Composite Section 108 to display data and graphic representations on the display unit 102 to allow a user to define an input scheme. The data and graphic representations displayed may be, for example, in the form of a window 48 shown in FIG. 4d. The Define Input Data Scheme section 111 also accepts inputs from the input device 101 which represent the user's definition of the input scheme, and stores the defined input data scheme into an Input Data Scheme File 112. An Input Data section 113 responds to requests from the input device 101 and instructs the Display Composite Section 108 to display data and graphic representations on the display unit 102 to allow a user to input data in accordance with the input data scheme stored in the Input Data Scheme File 112. The data and graphic representations displayed by section 113 may be, for example, in the form of a window 49 shown in FIG. 4e. The Input Data section 113 also accepts inputs from the input device 101 which represent the user-inputted data, i.e. input data to be processed by the ACCOUNTS system.

A Start Process section 114 receives the input data from the Input Data section 113 and, in response to requests from the input device 101 representing a user's requests to process the input data, executes the composed program (i.e. the corresponding composition of objects) in the Object-oriented Programming and Executing Environment 104. A Display States of Reuse Components section 115 displays on the display unit 102 the state of the objects in the Object-oriented Programming and Executing Environment 104. This display facilitates the viewing by a user of data processing results.

Definition of Custom Reuse Components

The specific functions performed by each reuse components, such as the Split, Classify, and Transform components illustrated in FIG. 4f, are defined by the user via the GUI. For example, as described earlier, a Split component splits the transaction posted to it and passes different data fields to different lower-level accounts according to a transaction mapping. The user defines a custom Split component by specifying, via the GUI, the transaction mapping using the GUI. A Classify component passes the transaction to one of a plurality of lower-level accounts depending on the value of a particular field. The user defines a custom Classify component by specifying, via the GUI, a correspondence between the value of the particular field and the lower-level account to which the transaction is to be passed.

Figure 6:
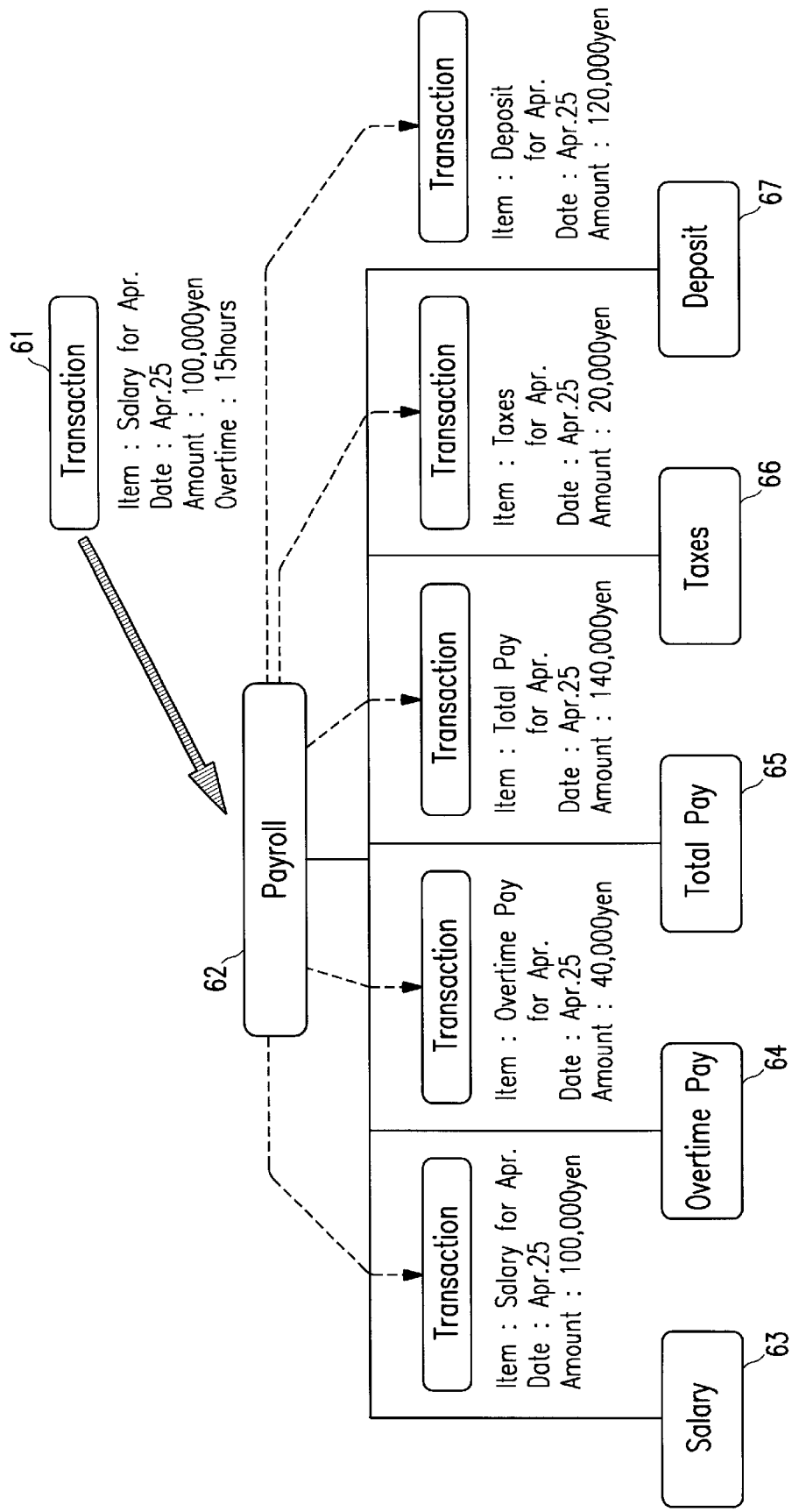
FIG. 6 illustrates a sample Transform component.

A custom Transform component, however, is more complicated to define since the operations a Transform component performs are complicated. FIG. 6 illustrates the functions of a exemplary Transform component, "Payroll" 62. In this example, upon receiving a transaction 61 containing monthly salary and overtime data, the Payroll component 62 posts a transaction containing the monthly salary data to the Salary account 63; calculates the overtime payment from the input overtime data and post it to the Overtime Pay account 64; calculates the total pay by adding the salary and overtime pay and post it to the Total Pay account 65; calculates taxes data and post it to the Taxes account 66; and calculates the net deposit by subtracting the taxes from the total pay and post it to the Deposit account 67. All of the lower-level accounts 63–67 in this example are simple accounts, which store the transaction posted to them.

Such a Transform component may be composed from one or more reuse program components using the program composition techniques described in this specification, whereby a Transform component may be created without the need to enter, modify or recompile any program code.

Figure 7A:
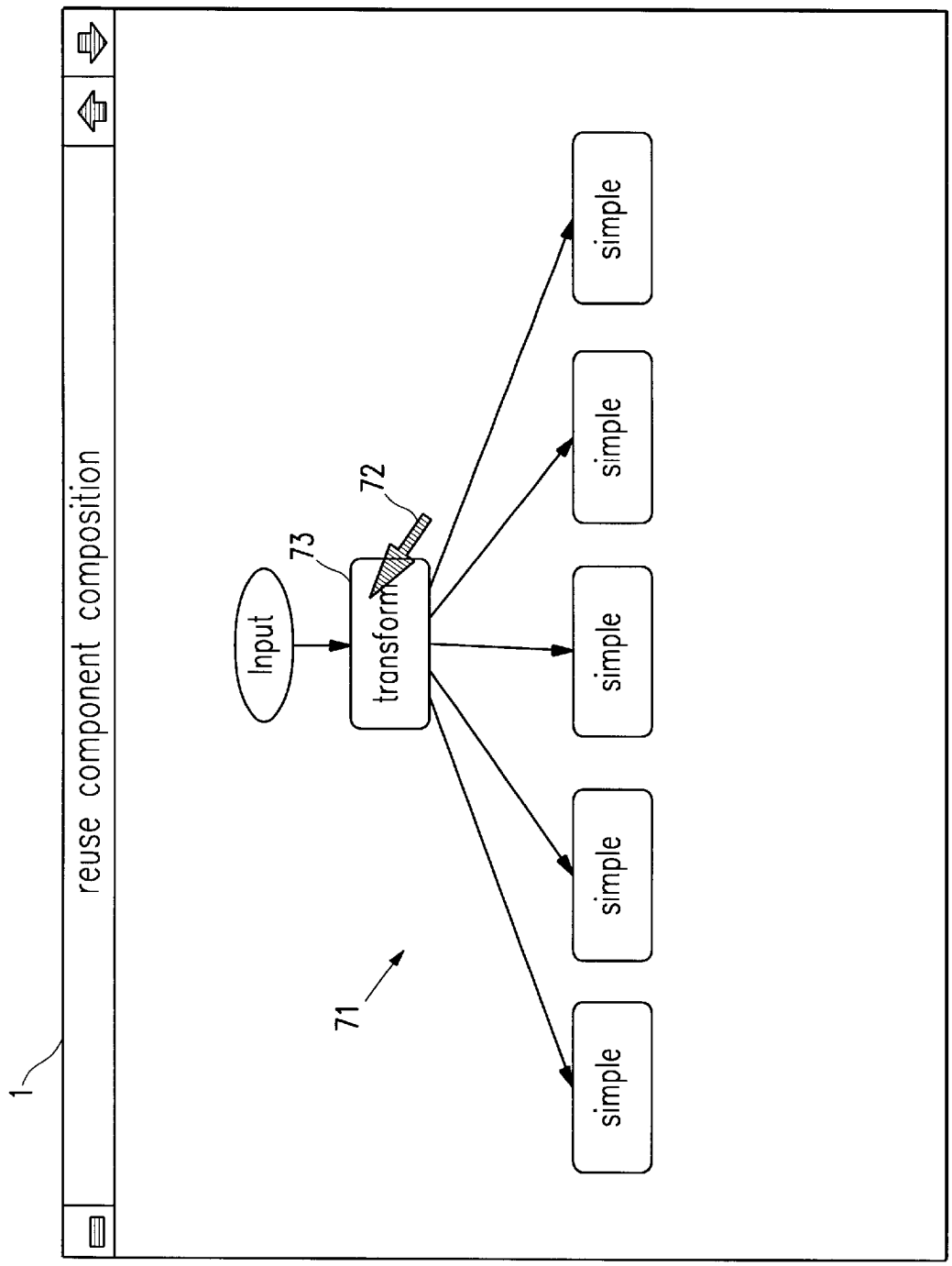
FIGS. 7a–7c show the construction of the Transform component of FIG. 6 using the graphic user interface according to an embodiment of the present invention.
Figure 7B:
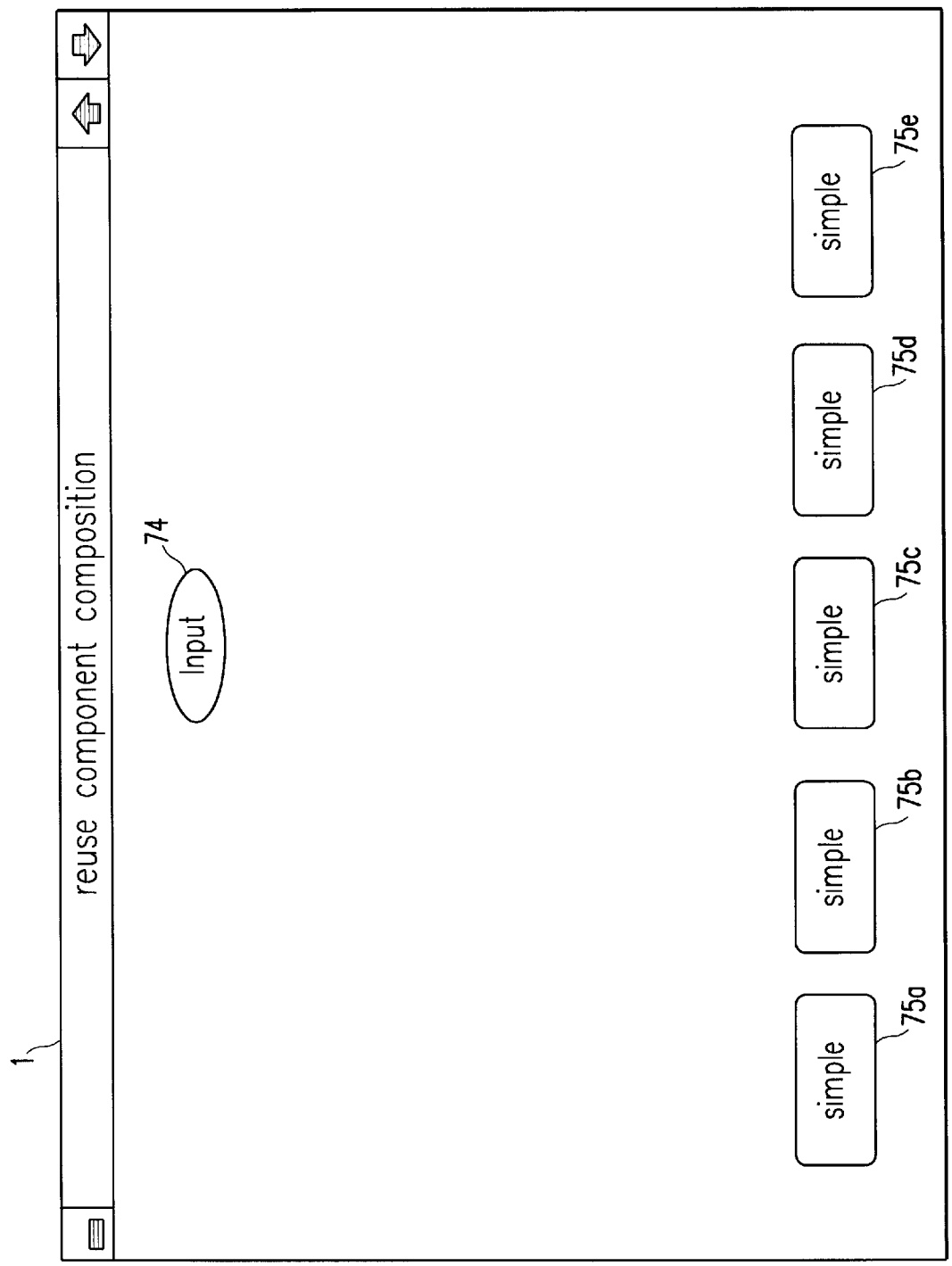
Figure 7C:
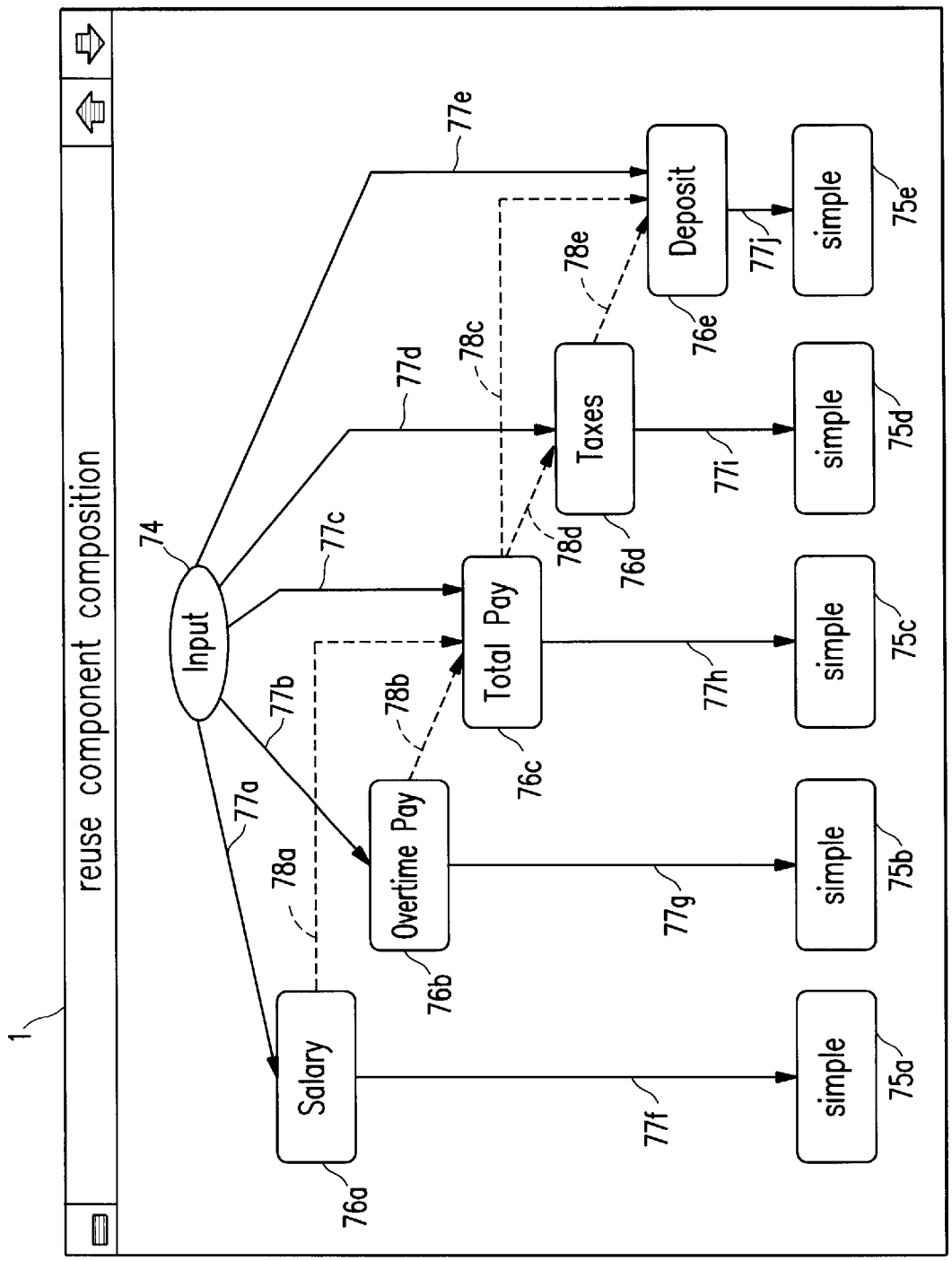

FIGS. 7a–7c illustrate the GUI used to compose a Transform component to perform the functions of the Payroll component of FIG. 6. As shown in FIG. 7a, a process tree 71 including a (yet undefined) Transform component is first displayed on the screen. The user defines the Transform component by, for example, clicking a mouse button while pointing the cursor 72 at the Transform icon 73. In response, the screen displays icons for the components that will collaborate with the Transform component to be defined (in this example, the Input component 74, which posts transactions to the Transform component, and the Simple components 75a–75e, to which the Transform component posts transactions), and leaves a blank area for defining the Transform component (FIG. 7b). Using the input techniques as described earlier with reference to FIGS. 4a–4c, the user then selects existing reuse components from a menu (not shown), such as Salary, Overtime Pay, Total Pay, Taxes, and Deposit, and places the corresponding icons 76a–76e on the screen (FIG. 7c). These reuse components are referred to as "transform rule" components since they represent rules, formulae, etc. used to define the operations of the Transform component "Payroll". The transform rule components may be provided by the system, or previously created by a programmer using the Object Oriented Programming and Executing Environment 104 (FIG. 5). Once created, the transform rule components are treated the same way as any other reuse components.

The user then draws directed lines, such as the solid lines 77a–77j and the dotted lines 78a–78e in FIG. 7c, linking the various components. Solid lines and dotted lines may be drawn using different input techniques, such as dragging the cursor while pressing the left mouse button versus dragging the cursor while pressing the right mouse button, etc. Each solid line represents an invocation of a destination component, which may include posting transactions from the invoking component to the destination component. For example, the solid line 77a represents the invocation of the Salary component 76a (the destination component) by the input component 74 (the invoking component), including posting the inputted transaction to the Salary component. Each dotted line represents a reference of an attribute of the source component by the destination component. For example, the dotted line 78a is a reference of an attribute (e.g. the salary data) of the Salary component 76a (the source component) by the Total Pay component 76c (the destination component). The referencing of an attribute of a source component by a destination component is accomplished by invoking, from within the destination component, a function of the source component (such as a "referTo" function), which returns the referenced attributes of the source component to the destination component.

In the example of FIG. 7c, when the Total Pay component 76c is invoked by the Input component 74, as represented by the solid line 77c, this invocation triggers the referencing of the Salary component 76a and the Overtime Pay component 76b, as represented by the dotted line 78a and 78b, respectively. The Total Pay component 76c then calculates the total pay data using the data returned by the Salary and Overtime Pay components. This total pay data may constitute an attribute of the Total Pay component and may be subsequently referenced by, for example, the Taxes component 76d and the Deposit component 76e.

Once the process tree is defined (FIG. 7c), the system composes the Transform component based on the reuse components 76a–76e and the invocations and references defined by the solid and dotted lines 77a–77g and 78a–78e. The Payroll component so defined by the user may be used to process input data (in this example, transactions posted to it by the Input component), and/or may be saved for use at a later time.

Composition of reuse components from existing reuse components is implemented using the same object-oriented programming techniques described earlier. In particular, it utilizes the ability of a member function of a component invoked by its preceding component to in turn invoke functions of the same name in its succeeding components. This technique facilitates the construction of chains of processes. The definition of reuse components involves the Define Reuse Components section 105 of FIG. 5.

The above example illustrate the definition of a Transform component by a user. Generally speaking, a user may use existing reuse components to build new reuse components to perform any desired functions. The user-defined reuse components may be used to construct a process tree for processing data, or used to define new reuse components. This promotes the reuse of code and facilitates modular or hierarchical system design, which enables the user to design larger and more complex program modules conveniently. All of these are done without the need to enter, modify or recompile any program code.

Changes in Business Rules

Another feature supported by the ACCOUNTS system is tracking of changes in business rules. Using the object-oriented programming techniques according to the present invention, changes in business rules may be tracked over time. This allows processing of a transaction that occurred at an earlier time, and ensures that the transaction will be processed according to the appropriate business rules in effect at the time the transaction occurred.

Figure 8:
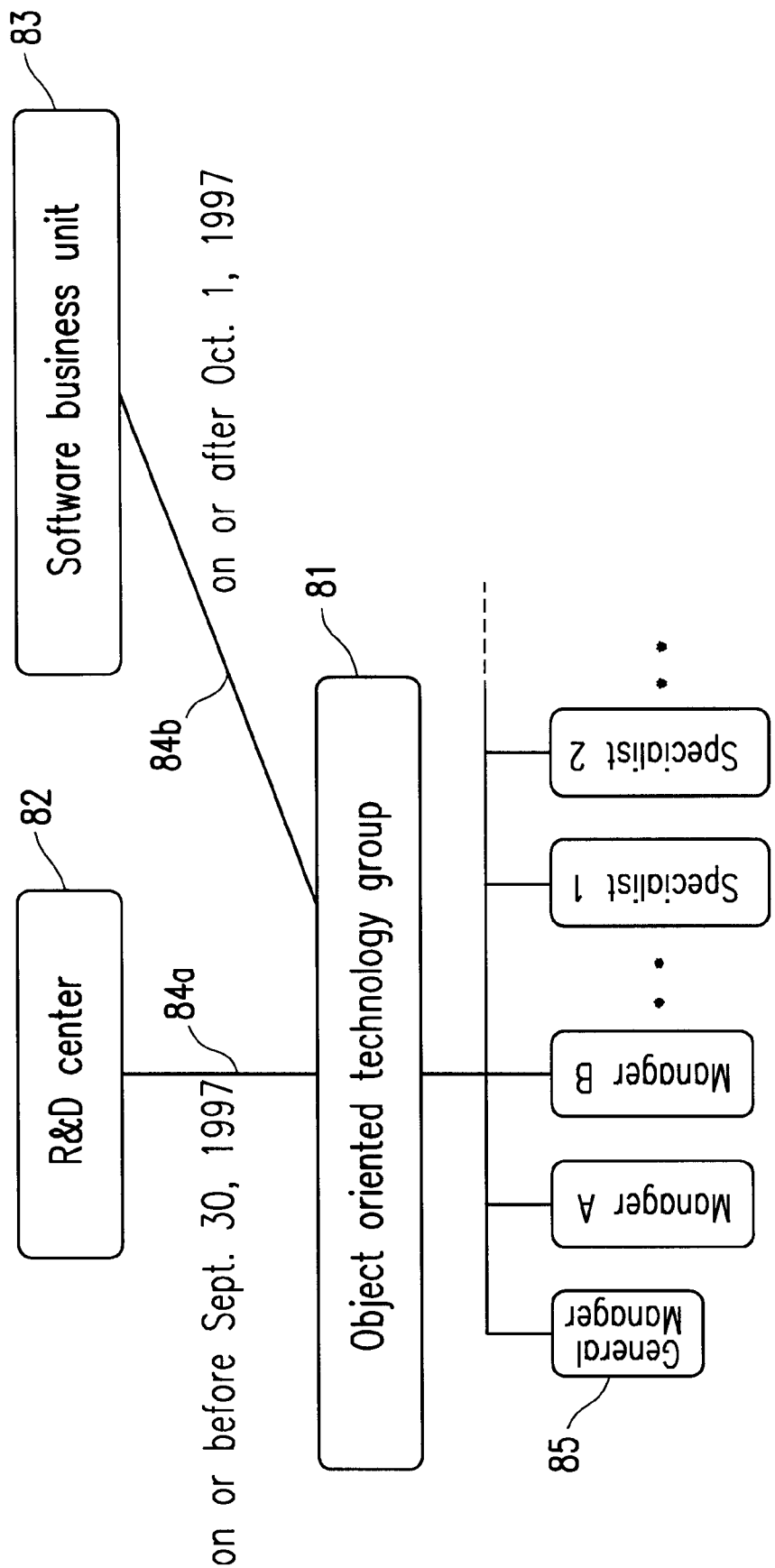
FIG. 8 illustrates an example of changing business rules.

Changes in business rules may be defined in terms of the time periods during which connections between components are valid. An example of changing business rules is illustrated in FIG. 8, which shows a portion of a organization chart of a business organization. As shown in FIG. 8, the business unit "Object Oriented Technology Group" 81 is a subunit of the business unit "R&D Center" 82 on or before Sep. 30, 1997, and becomes a subunit of the "Software Business Unit" 83 on Oct. 1, 1997. Thus, the link 84a between components 82 and 81 is valid only in the time period on or before Sep. 30, 1997, whereas the link 84b between components 83 and 81 is valid only in the time period on or after Oct. 1, 1997. (The lower level components 85 in FIG. 8 represent the subunits of the unit 81, and the links between components 81 and 85 remain valid in both time periods.)

Figure 9A:
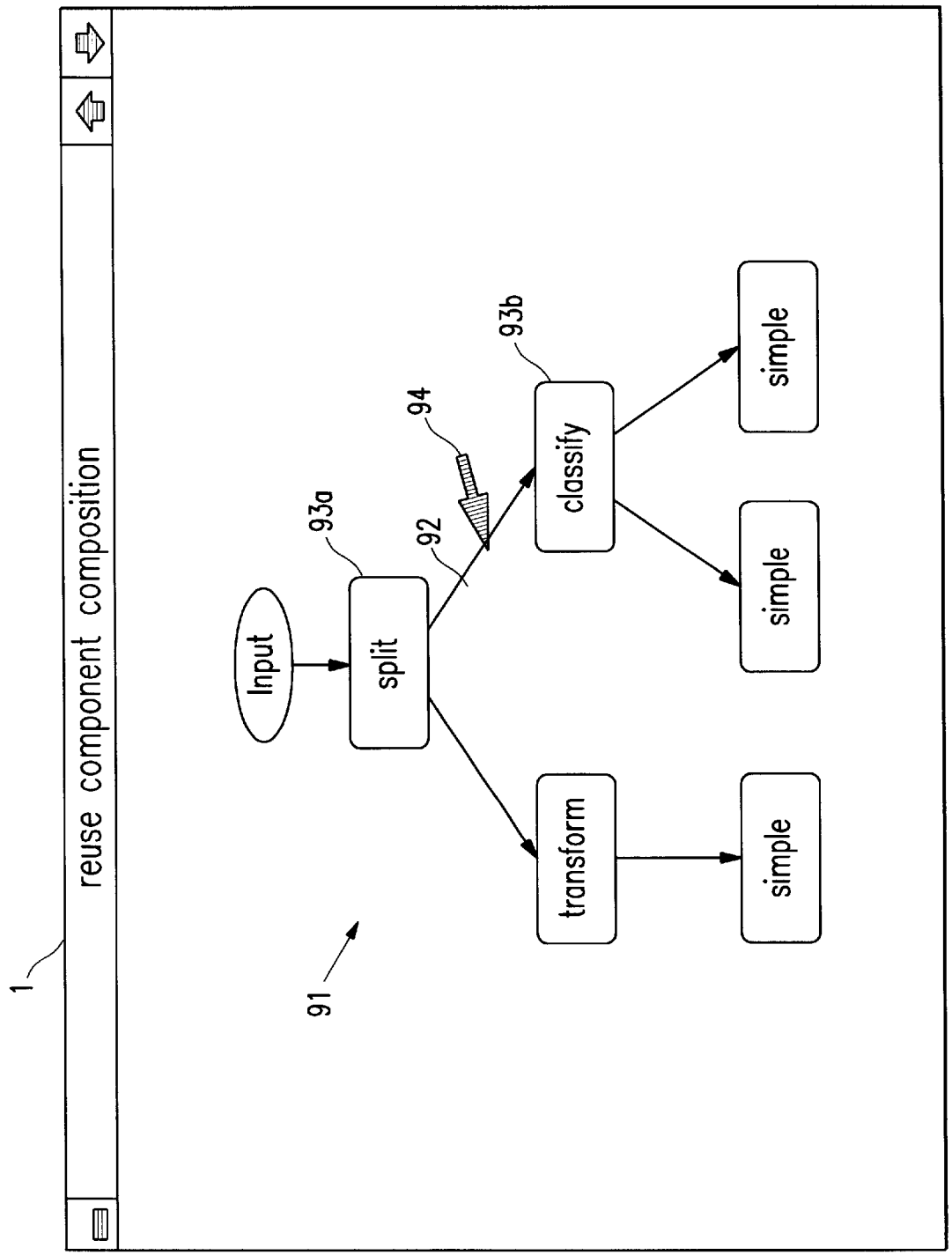
FIGS. 9a–9d show the use of the graphic user interface to effect changes of business rules.
Figure 9B:
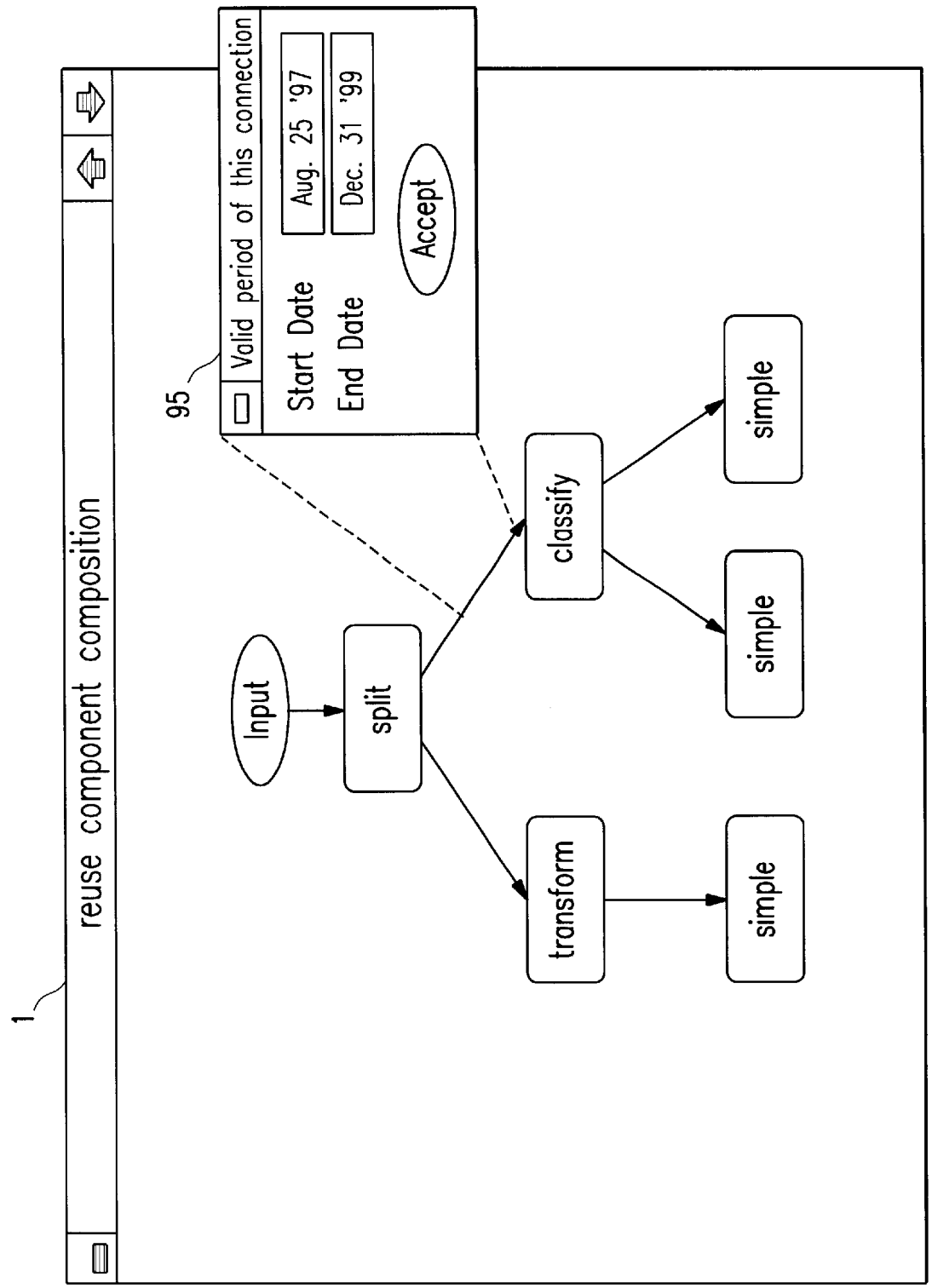
Figure 9C:
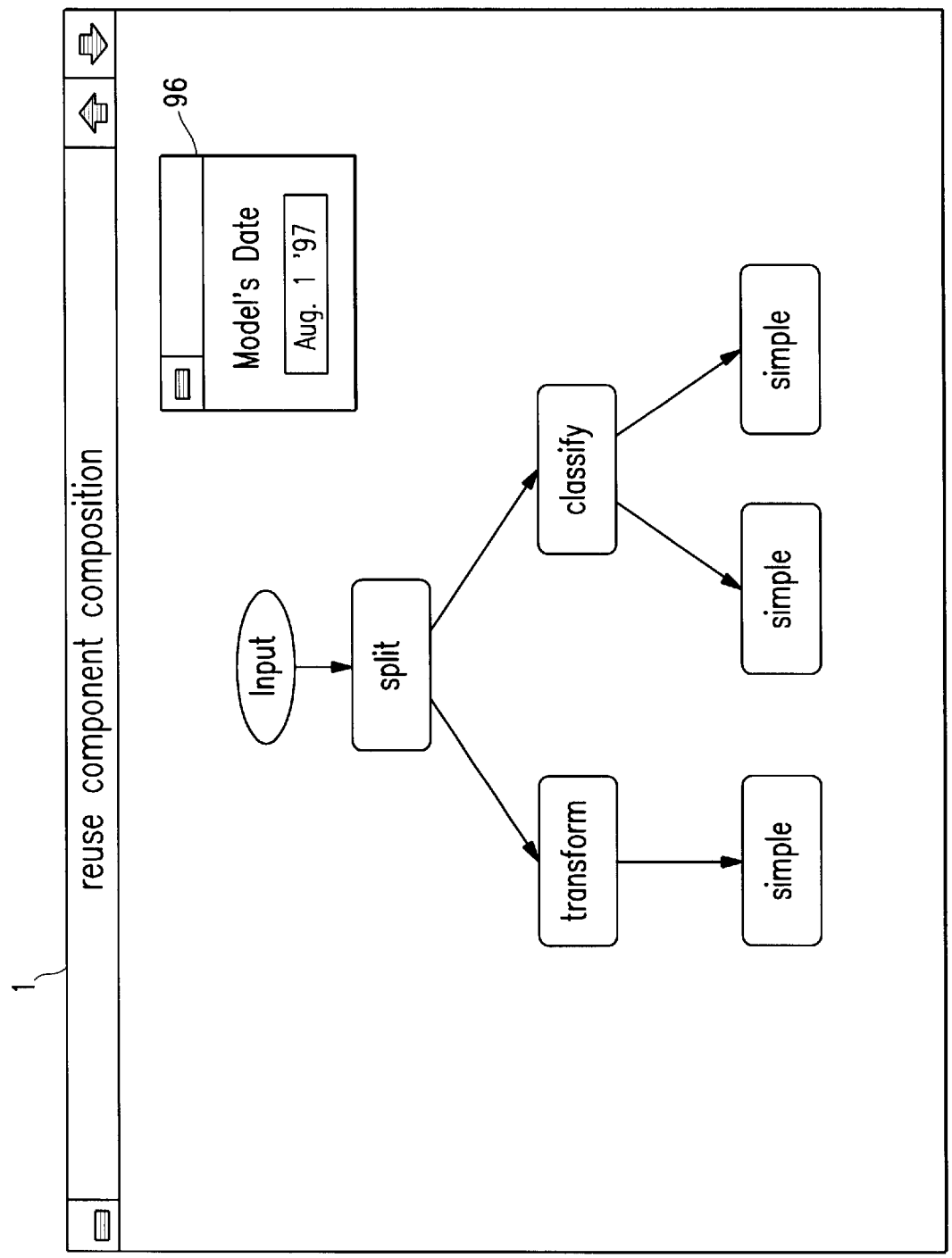
Figure 9D:
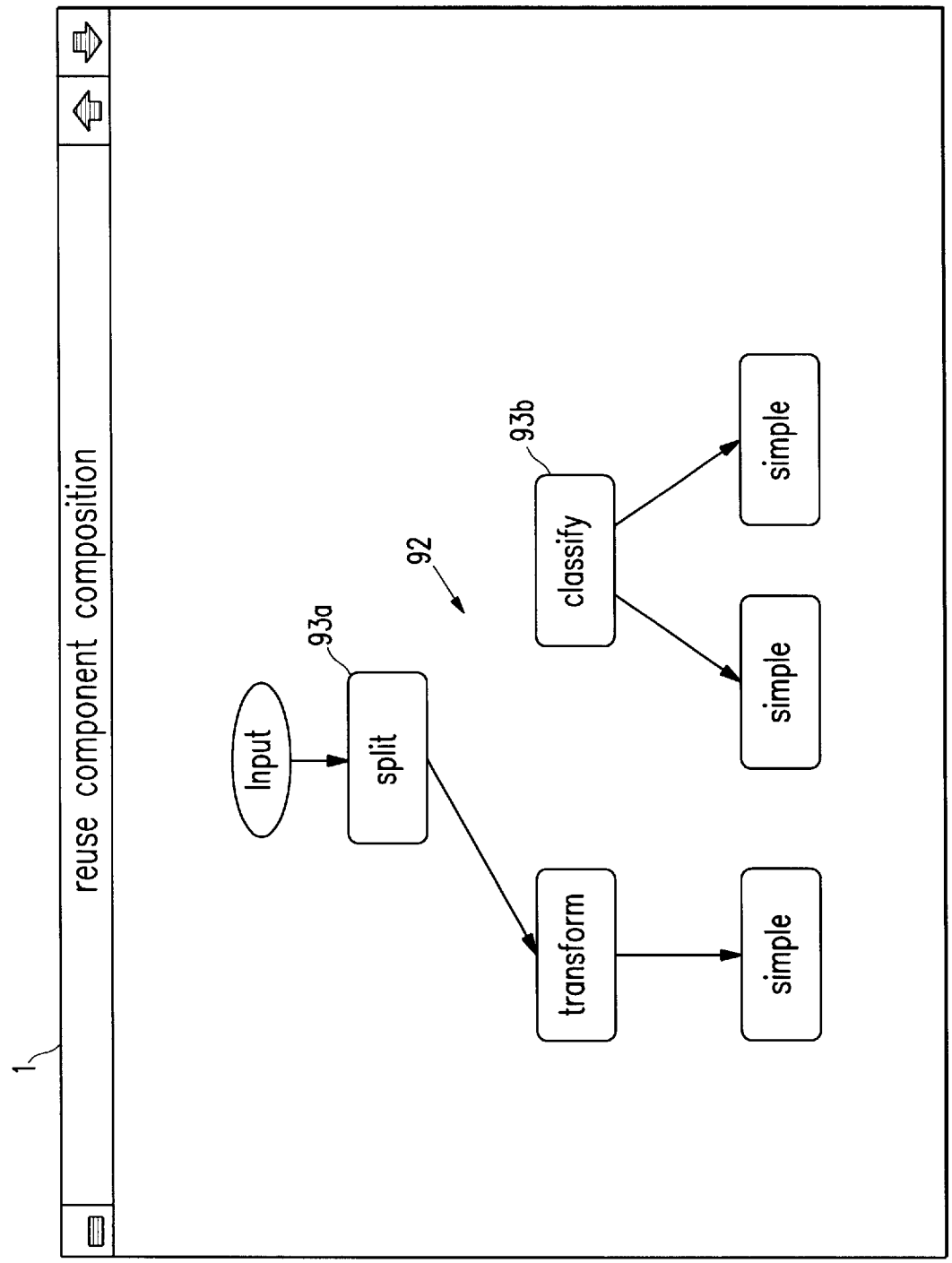

FIGS. 9a–9d illustrate the use of the graphic user interface to define and apply changing business rules. While a process tree 91 is displayed on the display screen, a user may define the valid periods of a particular link, for example, the link 92 between components 93a and 93b, by pointing the cursor 94 at the link 92 and clicking a mouse button (FIG. 9a). In response, a prompt, such as a window 95, is displayed on the screen to allow the user to enter the valid time period for the link 92 (FIG. 9b). The system stores the valid time periods for all the business rules entered by the user, which enables tracking of the changes in business rules over time. When the composed program is executed to process a transaction, the user will be prompted by a screen display, such as a window 96, to input the date on which the transaction being processed occurs (referred to as the "model date") (FIG. 9c). The model date can be any date. The program then processes the transaction according to the business rules in effect on the model date. In addition, when the program is executed for a particular model date, the process tree will be displayed on the screen in accordance with the business rules in effect on the model date. For example, when the model date is outside of the valid time period for the link 92, the line 92 will disappear from the process tree graph (FIG. 9d).

Figure 10A:
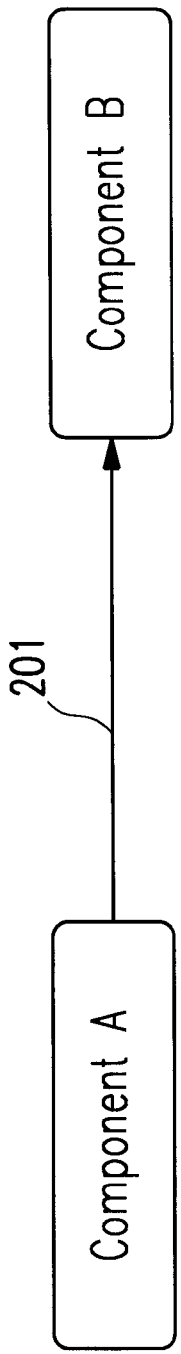
FIGS. 10a–10b illustrate one method of tracking changes in business rules using object-oriented programming techniques.
Figure 10B:
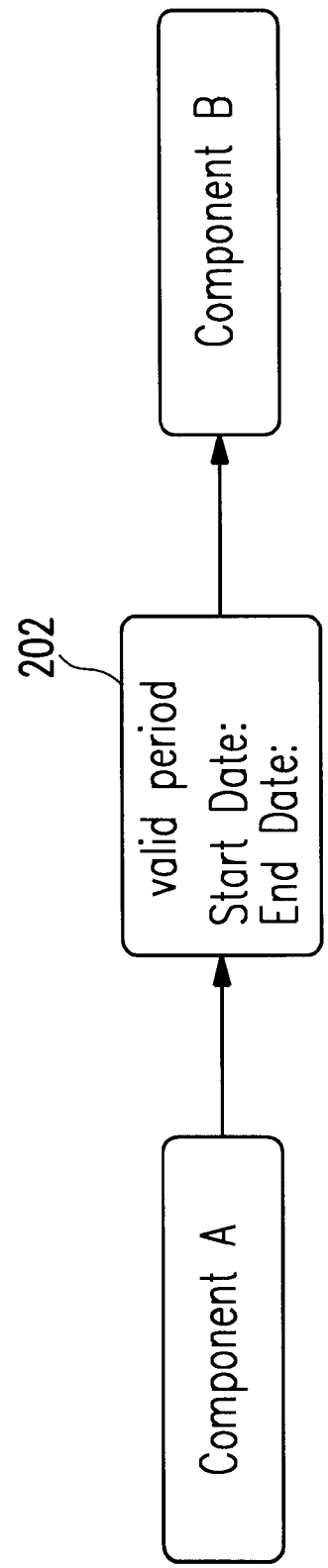

Tracking changes in business rules is implemented in object-oriented programming by representing the valid time periods for the connections as objects. As schematically illustrated in FIGS. 10a and 10b, when a user defines (via the GUI) the valid time period for a link 201 between components A and B, a valid time period component 202 is inserted in the chain of invocation from component A to component B. Alternatively, the valid time period component 202 may be automatically inserted when the link 201 is first created by the user. In the latter case, the time period for which the link 201 is valid remains unlimited until otherwise defined by the user.

Object-oriented programming techniques explained earlier are used to insert the valid time period component 202 and to create the chain of invocations shown in FIG. 10b without the need to enter, modify or recompile any program code. In particular, the valid time period component 202 is implemented to have the same interface as component B, enabling component A to invoke a member function in component 202 in the same way it invokes a member function of the same name in component B. When a member function in component 202 is invoked by component A, it compares the model date with the valid time period defined in component 202. If the model date is within the valid time period, the member function of component 202 invokes a member function of the same name in component B. If the model date is outside of the valid time period, the member function of component 202 will not invoke the member function of the same name in component B, and the chain of invocations will terminate.

Figure 11:
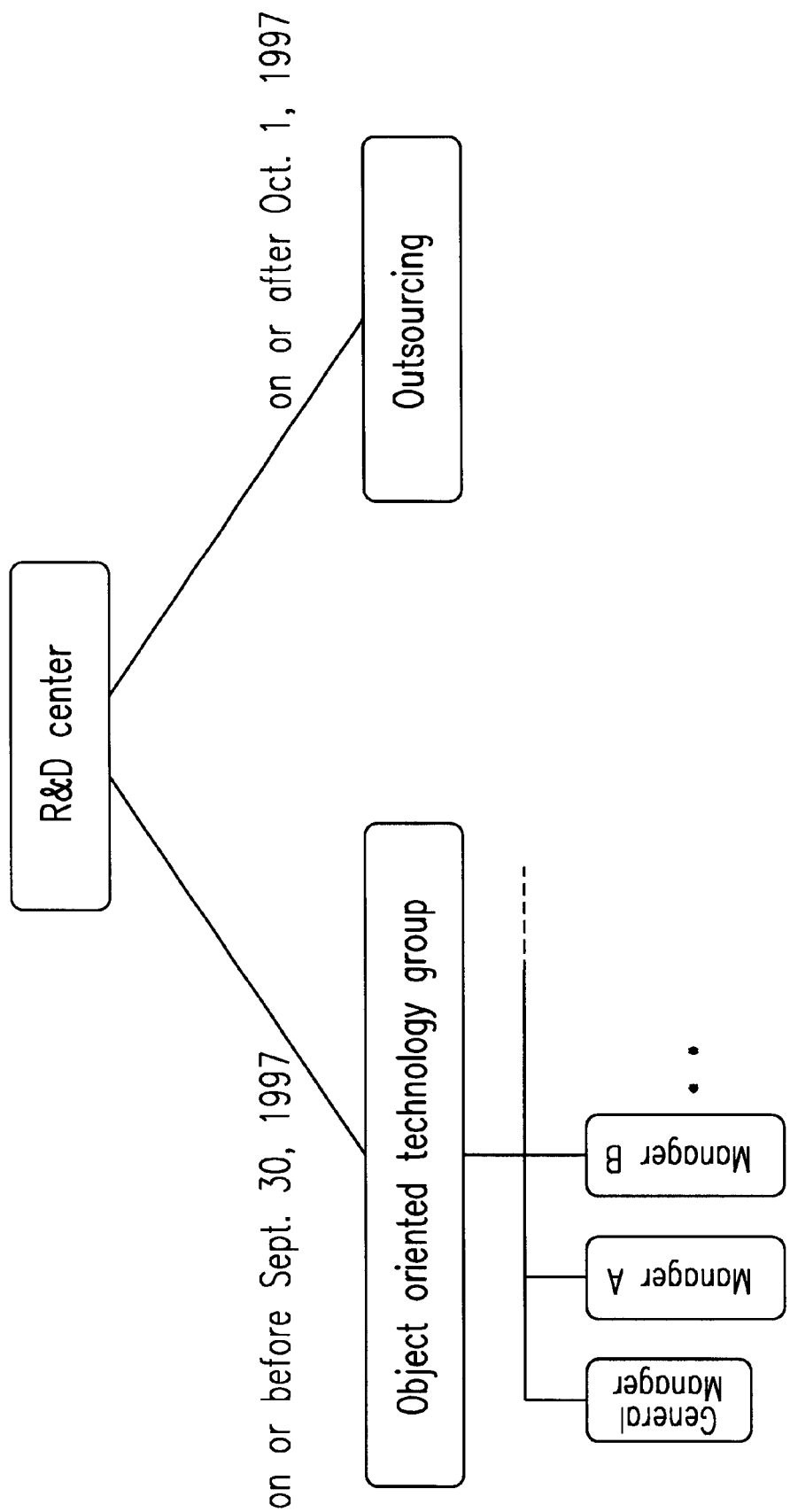
FIG. 11 illustrates another example of changing business rules.
Figure 12:
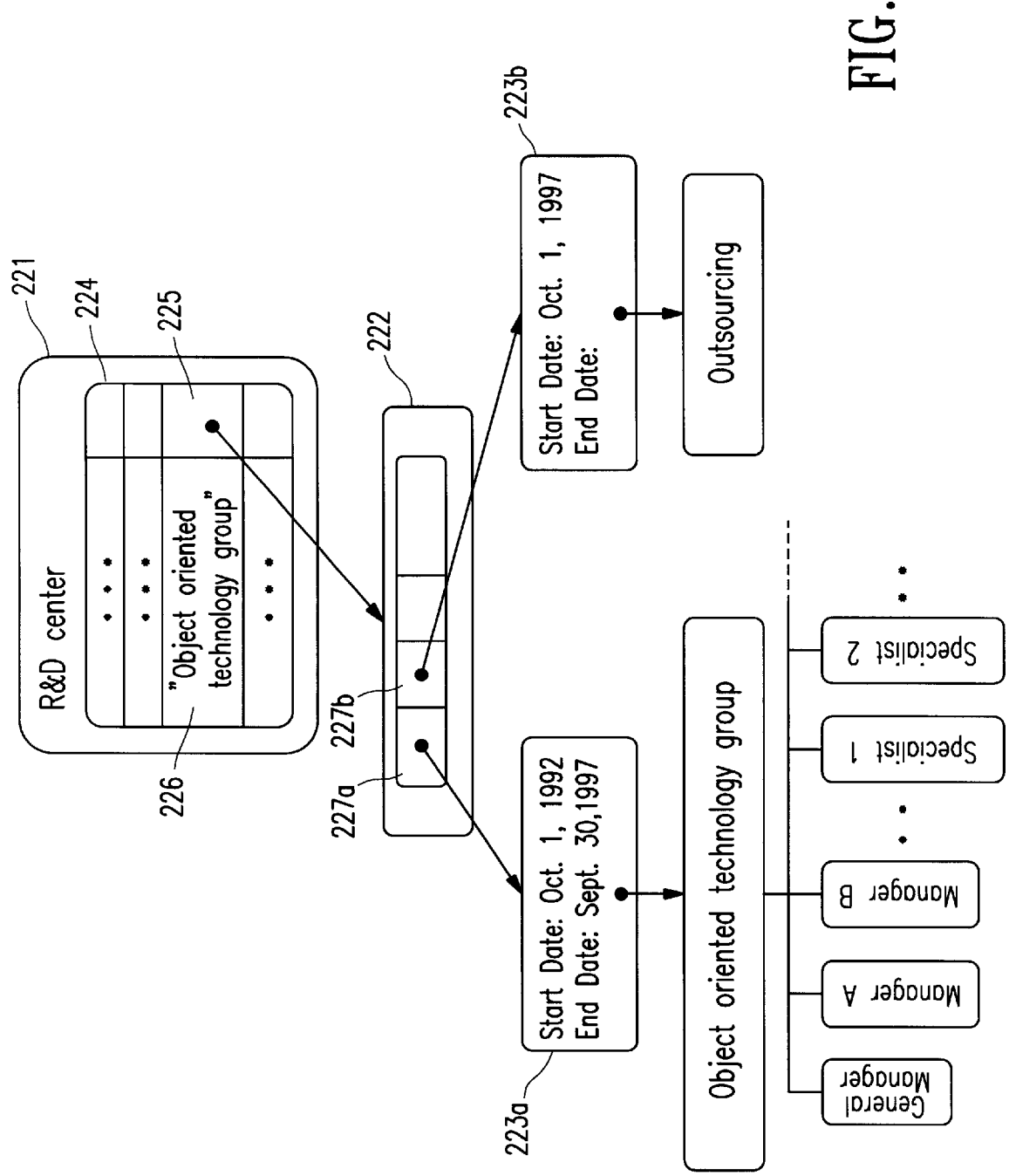
FIG. 12 illustrates a method of tracking changes in business rules for the example of FIG. 11 using object-oriented programming techniques.

Another example of changing business rules is a situation where a component has two or more succeeding components, and invokes one at a time, each during a respective valid time period. The valid time periods for the two or more succeeding components are mutually exclusive; i.e., none of the valid time periods overlaps with any other valid time periods. An example of this situation is illustrated in FIG. 11, which shows a portion of a business organization chart. In this example, the "R&D Center" includes "Object-oriented Technology Group" on or before Sep. 30, 1997; but starting Oct. 1, 1997, object-oriented technology development is outsourced. As illustrated in FIG. 12, tracking changes in business rules in this situation may be implemented in object-oriented programming by using a data structure such as a dictionary in the invoking component ("R&D Center"221), and by inserting a "component set" object 222 between the invoking component 221 and the two valid time period components 223a and 223b.

Dictionaries and sets are collection classes in an object-oriented programming system. A collection is an object that contains a group of other objects. A dictionary is a list of pairs of objects, each pair consisting of a "key" and a "value." The keys and values in a dictionary may be any objects. A set is a collection in which there are no duplicates.

As schematically shown in FIG. 12, the invoking component, R&D Center 221, employs a dictionary 224. In the dictionary 224, the value 225 of the key "Object-oriented Technology Group" 226 is the component set object 222. The component set object 222 holds a group of valid time period objects 227a, 227b, . . . , which define mutually exclusive valid time periods. Instead of invoking a member function in the valid time period objects as in the case of the example shown in FIG. 10b, the invoking component 221 in the present example invokes a member function of the same name in the component set object 222. The member function in the component set object 222 in turn invokes a member function of the same name in one of the valid time period objects 223a, 223b, . . . , depending on the time when the invocation occurs (i.e. the model date).

The component set object and the valid time period objects may be inserted automatically by the computer when the links between the component 221 and components 223a, 223b are created, or when the mutually exclusive time periods are defined by the user. Before adding a new valid time period object, the component set object 222 determines whether the time period defined in the new object to be added is exclusive with respect to the time periods of the other objects held in the component set 222. The new valid time period object will be added only if the time period defined is exclusive with respect to other time periods.

Using the object-oriented programming techniques described earlier, the insertion of component set objects and the addition of valid time period objects into a component set may be accomplished without the need to enter, modify or recompile any program code.

Figure 13:
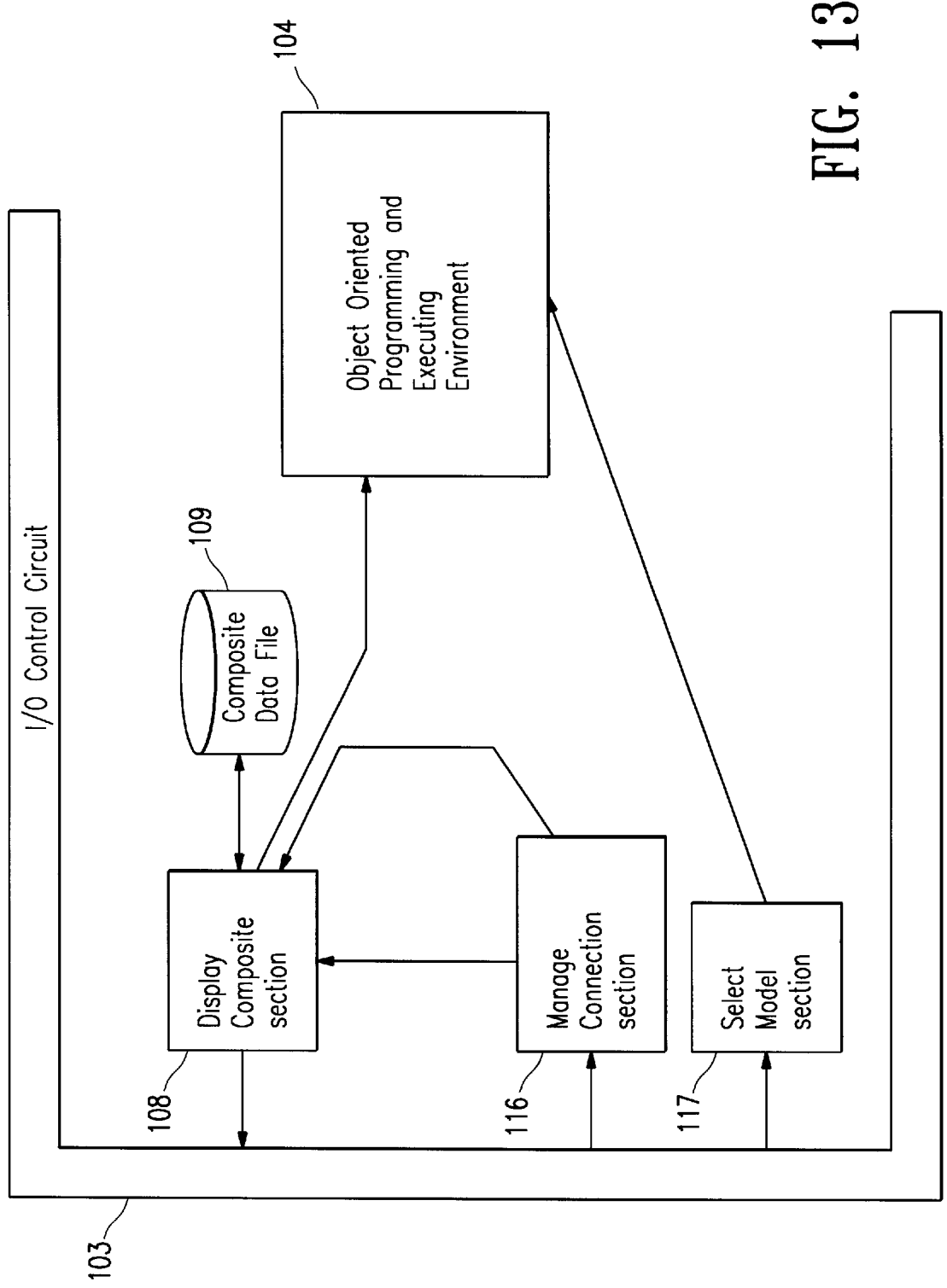
FIG. 13 is a partial functional block diagram illustrating the structure of an embodiment of the present invention implementing changes of business rules.

FIG. 13 is a partial functional block diagram of the structure of an embodiment implementing the tracking of changes in business rules. All functional components in the structure shown in FIG. 5 are included in the present embodiment, although some are omitted from FIG. 13. As shown in FIG. 13, a Manage Connection section 116 accepts input data from the input device which represent a user's definition of a valid time period for a connection between two components, and instructs the Display Composite section 108 to display graphic representations of the connection in accordance with the inputted valid time period. Section 108 stores data representative of the valid time period inputs in the Composite Data File 109, and creates objects and invocations of the objects in the Object-oriented Programming and Executing Environment 104. A Select Model section 117 accepts input data from the input device which represent the model date, and instructs the Display Composite section 108 to display graphic representations in accordance with the model date. For example, section 108 may display a particular connection between two components in a process tree if the model date is within the valid time period of that connection, or omit the connection from the displayed process tree if the model date is outside of the valid time period (see FIG. 9d). In addition, the Select Model section 117 sets the model date in an appropriate variable of the program, such as a global variable, so that the model date may be accessed by all objects in the Object-oriented Programming and Executing Environment 104.

In the embodiments illustrated this specification, the GUI is described using examples of specific inputting devices and techniques, such as cursor pointing, mouse button clicking, etc. It should be readily apparent to a skilled artisan that other types of input devices and techniques may be used, such as a touch panel, light pen, track ball, etc.

The interface between the ACCOUNTS system and a user is described as a graphic user interface (GUI). A non-graphic, or textual user interface may also be used for inputting all information required to interact with the system. Such a non-graphic interface may employ, for example, textual prompts to request input from a user. For example, in lieu of a pop-up menu shown in FIG. 4a, a list of available reuse components may be printed on a text display, followed by a prompt for the user to enter the name of the selected reuse component. Similarly, a prompt may be used to request the user to define a connection between reuse components, such as by prompting for the names of the "from" and "to" components for the connection. In addition, a mixed graphic and non-graphic user interface may also be used. Like in the graphic user interface, in a non-graphic user interface, the user does not need to enter any program code, nor is any code generated by the system. Regardless of the type of user interface used, the object-oriented programming techniques described in this specification apply to accomplish program composition without the need to modify or recompile the program. Further, the functional units of the system structure, shown in FIGS. 5 and 13, are operable to produce appropriate displays in accordance with the type of user interface employed.

The techniques described in this specification for implementing changes of business rules over time may be used to implement business rules that vary with other conditions, such as the characteristics of the user, etc. The object-oriented programming techniques described herein enables user-definition of such conditions at run-time without the need to generate, modify, or recompile any program code. This enhances the flexibility and versatility of the software in modeling real world objects and their relationships.

While embodiments and applications of the present invention have been shown and described, it should be apparent to those skilled in the art that many more modifications are possible without departing from the inventive concepts herein. The presently disclosed embodiments are therefore to be considered in all respects as illustrative and not restrictive, the scope of the invention being indicated by the appended claims, rather than the foregoing description. The accompanying claims are intended to cover such and other modifications as would fall within the true scope and spirit of the present invention. All changes which come within the meaning and range of equivalency of the claims are therefore intended to be embraced therein.

We claim:

1. A method for constructing a programming framework based on reuse program components for processing data using a programmed computer having a display device, a user input device and a memory, the method comprising:
    storing in the memory a plurality of reuse program components each representing a unit of process for processing data;
    displaying first and second program component icons representing first and second stored reuse program components, respectively, each program component icon being displayed in response to a first user input;
    displaying an invocation icon representing an invocation of the second stored reuse program component by the first stored reuse program component, the invocation icon being displayed in response to a second user input;
    receiving from the user input device input data to at least one of the first and second stored reuse program components; and
    processing the input data using the first and second stored reuse program components, wherein the first reuse program component invokes the second reuse program component in accordance with the invocation represented by the invocation icon free of generating, modifying or compiling any program code.

2. The method of claim 1, further comprising:
    composing and storing in the memory a user-defined reuse program component for processing data using the first and second reuse program components and in accordance with the invocation represented by the invocation icon free of generating, modifying or compiling any program code.

3. A method implemented in a programmed computer having a memory for composing a program from reuse program components, the method comprising:
    storing a plurality of reuse program components each representing a unit of process in an object oriented programming system, the plurality of reuse program components having the same programming interface;
    selecting first and second reuse program components from the stored plurality of reuse program components;
    defining an invocation of the second reuse program component by the first reuse program component; and
    composing a program using the selected reuse program components in accordance with the defined invocation, wherein the first reuse program component invokes the second reuse program component by using the programing interface.

4. The method of claim 3, further comprising defining a condition for the invocation of the second reuse program component by the first reuse program component, wherein the invocation occurs only if the condition is satisfied.

5. The method of claim 4, wherein the condition is defined by a condition component, the first reuse program component invoking the condition component, and the condition component invoking the second reuse program component only when the condition is satisfied.

6. The method of claim 3, further comprising defining a plurality of conditions each for an invocation of one of a plurality of second reuse program components by the first reuse program component, wherein the first reuse program component invokes one of the plurality of second reuse program components dependent upon which condition is satisfied.

7. The method of claim 6, wherein the conditions are defined by a component set component, the component set component holding a plurality of condition components each representing the condition for invoking one of the plurality of second reuse program components, the first reuse program component invoking the component set component, and the component set component invoking one of the plurality of second reuse program components depending upon which condition is satisfied.

8. The method of claim 3, wherein the composing step is performed free of generating, modifying or compiling any program code.

9. The method of claim 3, wherein the step of selecting the reuse program components and defining the invocation are performed in response to information inputted by a user at run time.

10. A computer program product comprising a computer usable medium having a computer readable code embodied therein for composing a program from reuse program components, the computer program product comprising:
    first computer readable program code configured to cause a computer to store a plurality of reuse program components each representing a unit of process in an object oriented programming system, the plurality of reuse program components having the same programming interface;

second computer readable program code configured to cause a computer to select first and second reuse program components from the plurality of reuse program components; and third computer readable program code configured to cause a computer to define an invocation of the second reuse program component by the first reuse program component; and fourth computer readable program code configured to cause a computer to compose a program using the selected reuse program components in accordance with the defined invocation, wherein the first reuse program component invokes the second reuse program component by using the programming interface.

11. The computer program product of claim 10, wherein the fourth computer readable program code is configured to cause a computer to compose a program using the selected reuse program components in accordance with the defined invocation free of generating, modifying or compiling any program code.

12. The computer program product of claim 10, further comprising a fifth computer readable program code configured to cause a computer to define a condition for the invocation of the second reuse program component by the first reuse component, wherein the invocation occurs only if the condition is satisfied.

13. The computer program product of claim 10, wherein the selection of the reuse program components and the invocation are performed in response to information inputted by a user at run time.

14. A method implemented in a programmed computer having a memory for composing a program from reuse program components, the method comprising:

storing a plurality of reuse program components each representing a unit of process in an object oriented programming system and each having a data structure for holding a plurality of elements;

selecting first and second reuse program components from the stored plurality of reuse program components;

defining an invocation of the second reuse program components by the first reuse program component; and composing a program using the selected reuse program components in accordance with the defined invocation by assigning the second reuse program component to one of the elements of the data structure in the first reuse program component.

15. The method of claim 14, wherein the reuse program components are classes in an object-oriented programming system and are provided with functions having the same programming interface.

16. The method of claim 14, wherein the composing step is performed free of generating, modifying or compiling any program code.

17. The method of claim 14, further comprising defining a condition for the invocation of the second reuse program component by the first reuse program component, wherein the invocation occurs only if the condition is satisfied.

18. The method of claim 14, wherein the step of selecting the reuse program components and defining the invocation are performed in response to information inputted by a user at run time.

19. A computer program product comprising a computer usable medium having a computer readable code embodied therein for composing a program from reuse program components, the computer program product comprising:

first computer readable program code configured to cause a computer to store a plurality of reuse program components each representing a unit of process in an object oriented programming system, each reuse program components having a data structure for holding a plurality of elements;

second computer readable program code configured to cause a computer to select first and second reuse program components from the stored plurality of reuse program components; and third computer readable program code configured to cause a computer to define an invocation of the second reuse program components by the first reuse program component; and fourth computer readable program code configured to cause a computer to compose a program using the selected reuse program components in accordance with the defined invocation by assigning the second reuse program component to one of the elements of the data structure in the first reuse program component.

20. The computer program product of claim 19, wherein the reuse program components are classes in an object-oriented programming system and are provided with functions having the same programming interface.

21. The computer program product of claim 19, wherein the fourth computer readable program code is configured to cause a computer to compose a program using the selected reuse program components in accordance with the defined invocation free of generating, modifying or compiling any program code.

22. The computer program product of claim 19, further comprising a fifth computer readable program code configured to cause a computer to define a condition for the invocation of the second reuse program component by the first reuse program component, wherein the invocation occurs only if the condition is satisfied.

23. The computer program product of claim 19, wherein the selection of the reuse program components and the invocation are performed in response to information inputted by a user at run time.

24. A plurality of classes in an object-oriented programming system, each class being provided with a function through which an object instantiated from the class is invoked by another object, the functions for all of the plurality of classes having an identical programming interface, each class having a data structure for holding a plurality of elements, the elements having the type of an object provided with a function having the identical programming interface, and each class further defining an invocation of objects having the identical programming interface that are assigned to the elements of the data structure.

25. An execution method in an object-oriented programming system, comprising:

defining a plurality of classes each providing with a function through which an odject instantiated from the class is invoked by another object, the functions for all of the plurality of classes having an identical programming interface;

providing a data structure in each of the plurality of classes for holding a plurality of elements, the elements having the type of an object provided with a flnction having the identical programming interface;

providing an invocation in each of the plurality of classes for invoking objects assigned to the elements of the data structure; and assigning, in response to a user input at run time, an object instantiated from one of the plurality of classes to one of the elements of the data structure of an object instantiated from another one of the plurality of classes, whereby any desired invocation of one object by another object is accomplished by the run time assignment free of generating, modifying or compiling any program code.

* * * * *